United States Patent
Davis et al.

(10) Patent No.: US 8,695,086 B2
(45) Date of Patent: *Apr. 8, 2014

(54) SYSTEM AND METHOD FOR USER AUTHENTICATION

(75) Inventors: Charles Frederick Lee Davis, Richland, WA (US); Michael Patrick Schmidt, Pasco, WA (US); Herbert Lewis Alward, Coeur d'Alene, ID (US)

(73) Assignee: Identity Metrics, Inc., Centreville, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/226,429

(22) Filed: Sep. 6, 2011

(65) Prior Publication Data

US 2011/0321157 A1    Dec. 29, 2011

Related U.S. Application Data

(63) Continuation of application No. 11/818,885, filed on Jun. 14, 2007, now Pat. No. 8,051,468.

(60) Provisional application No. 60/813,556, filed on Jun. 14, 2006, provisional application No. 60/813,557, filed on Jun. 14, 2006.

(51) Int. Cl.
*G06F 21/00*    (2013.01)

(52) U.S. Cl.
USPC ........................................... 726/19; 713/186

(58) Field of Classification Search
USPC .............. 726/1–7, 26–31; 713/168, 182, 186; 707/999.006
See application file for complete search history.

(56) References Cited

U.S. PATENT DOCUMENTS

| | | |
|---|---|---|
| 4,621,334 A | 11/1986 | Garcia |
| 4,805,222 A | 2/1989 | Young et al. |
| 5,343,529 A | 8/1994 | Goldfine et al. |
| 5,386,103 A | 1/1995 | DeBan et al. |
| 5,870,723 A | 2/1999 | Pare, Jr. et al. |
| 5,974,162 A | 10/1999 | Metz et al. |
| 6,006,188 A | 12/1999 | Bogdashevsky et al. |
| 6,012,052 A | 1/2000 | Altschuler et al. |
| 6,151,593 A | 11/2000 | Cho et al. |

(Continued)

FOREIGN PATENT DOCUMENTS

EP    1255392    11/2002

OTHER PUBLICATIONS

Bandi, K. R., et al., "Writer Demographic Classification Using Bagging and Boosting", (Jun. 2005),133-137.

(Continued)

*Primary Examiner* — Gilberto Barron, Jr.
*Assistant Examiner* — Abdulhakim Nobahar
(74) *Attorney, Agent, or Firm* — Tsircou Law, P.C.

(57) ABSTRACT

A system and a related method are disclosed for authenticating a user of an electronic system. The system, and related method access (a) data relating to a defined interaction with an input device for a purported authorized user, (b) a probability distribution representation for the defined interaction for an authorized user, and (c) a probability distribution representation for the defined interaction for a wide population, from which it can determine value indicative of whether the purported authorized user is the authorized user. The purported authorized user can be authenticated as the authorized user, if the value satisfies a prescribed threshold.

20 Claims, 18 Drawing Sheets

(56) References Cited

U.S. PATENT DOCUMENTS

| | | |
|---|---|---|
| 6,173,260 B1 | 1/2001 | Slaney |
| 6,298,348 B1 | 10/2001 | Eldering |
| 6,311,272 B1 | 10/2001 | Gressel |
| 6,429,927 B1 | 8/2002 | Borza |
| 6,442,692 B1 | 8/2002 | Zilberman |
| 6,487,662 B1 | 11/2002 | Kharon et al. |
| 6,553,494 B1 | 4/2003 | Glass et al. |
| 6,810,480 B1 | 10/2004 | Parker et al. |
| 6,938,159 B1 | 8/2005 | O'Connor et al. |
| 6,957,185 B1 | 10/2005 | Labaton et al. |
| 6,983,061 B2 | 1/2006 | Ikegami et al. |
| 7,130,452 B2 | 10/2006 | Bolle et al. |
| 7,133,792 B2 | 11/2006 | Murakami et al. |
| 7,206,938 B2 | 4/2007 | Bender et al. |
| 7,245,218 B2 | 7/2007 | Ikehara et al. |
| 7,249,263 B2 | 7/2007 | Chaudhari et al. |
| 7,327,859 B1 | 2/2008 | Chau |
| 7,370,208 B2 | 5/2008 | Levin et al. |
| 7,441,123 B2 * | 10/2008 | Grant et al. ............ 713/186 |
| 7,494,061 B2 | 2/2009 | Reinhold |
| 7,509,686 B2 | 3/2009 | Checco |
| 7,565,548 B2 | 7/2009 | Fiske et al. |
| 7,747,044 B2 * | 6/2010 | Baker et al. ............ 382/116 |
| 7,818,290 B2 | 10/2010 | Davis et al. |
| 2001/0004733 A1 | 6/2001 | Eldering |
| 2002/0095586 A1 | 7/2002 | Doyle et al. |
| 2002/0112171 A1 | 8/2002 | Ginter et al. |
| 2002/0129368 A1 | 9/2002 | Schlack et al. |
| 2002/0174347 A1 | 11/2002 | Ting |
| 2003/0051147 A1 | 3/2003 | Maeda et al. |
| 2003/0065595 A1 | 4/2003 | Anglum |
| 2003/0074201 A1 | 4/2003 | Grashey et al. |
| 2004/0015714 A1 | 1/2004 | Abraham et al. |
| 2004/0034558 A1 | 2/2004 | Eskandari |
| 2005/0008148 A1 | 1/2005 | Jacobson |
| 2006/0104484 A1 | 5/2006 | Bolle et al. |
| 2006/0104486 A1 | 5/2006 | Le Saint et al. |
| 2006/0123241 A1 * | 6/2006 | Martinian et al. ......... 713/186 |
| 2006/0195328 A1 * | 8/2006 | Abraham et al. ......... 705/1 |
| 2006/0206724 A1 | 9/2006 | Schaufele et al. |
| 2006/0224898 A1 | 10/2006 | Ahmed |
| 2006/0288234 A1 | 12/2006 | Azar et al. |
| 2007/0005988 A1 * | 1/2007 | Zhang et al. ............ 713/186 |
| 2007/0011039 A1 | 1/2007 | Oddo |
| 2007/0036395 A1 | 2/2007 | Okun |
| 2007/0174633 A1 | 7/2007 | Draper |
| 2007/0245157 A1 | 10/2007 | Giobbi et al. |
| 2007/0283416 A1 * | 12/2007 | Renaud ............. 726/2 |
| 2008/0104415 A1 | 5/2008 | Palti-Wasserman et al. |

OTHER PUBLICATIONS

"Body for Electronic Signatures Uniform Electronic Transactions Act (UETA)" (1999).

Cottrell, G. W. and Matcalfe J., "EMPATH: Face, Emotion, and Gender Recognition using Holons", Proc. 1990 Conf. Advances Nerual Information Processing Systems, 1990, Denver, Co, pp. 564-571.

Golomb, B.A.; Lawrence, D.T.; and Sejnowski, L.J. "SexNet: A Neural Network Identifies Sex from Human Faces", Proc. 1990 Conf. Advances Neural Information Processing Systems, 1990, Denver, Colorado, pp. 572-577.

Gunetti, D et al., "Keystroke Analysis of Free Text", ACM Transactional in Information and Systems Security, vol. 8, Aug. 2005, pp. 312-347.

Han, J.Y., "Low Cost Multi-Touch Sensing Through Frustrated Total Internal Reflection" UISL '05, Oct. 2005, Seattle, ACM, pp. 115-118.

Henniger, O. et al., "Improving the Binding of Electronic Signatures to the Signer by Biometric Authentication", (2006), p. 523-530.

Lu, X.; Chen H.; and Jain A. K., "Multimodal Facial Gender and Ethnicity Identification," Advances in Biometrics; International Conference, Hong Kong, China (2006), pp. 554-561.

Monrose, F. et al., "Password Hardening Based on Keystroke Dynamics," Proceeding of sixth ACM Conference on Computer and Communications Security, CCCS (1999).

Obaidat, M. S. and Sadoun, B. "Keystroke Dynamics Based Authentication" in Biometrics: Personal Identification in Networked Society, Anil Jain et al., editors, Kluwer, MA. (1998).

Pusara, M. et al., "User ReAuthentication via Mouse Movements", (2004),pp. 1-8.

Sato, Y. et al., "On-line Signature Verification Based on Shape, Motion, and Writing Pressure", Proc. $6^{th}$ In. Conf. Pattern on Recognition (1982), pp. 823-826.

"The Electronic Signatures in Global and National Commerce Act", (*ESIGN*), (Jun. 30, 2000), 106/229.

Yun, M. H., et al., "Classification of Bluffing Behavior and Affective Attitude from Prefrontal Surface Encephalogram During On-Line Game", (2006), pp. 562-570.

Zhang, S. et al., "Continuous Verification Using Multimodal Biometrics", (2006), pp. 562-570.

"SecurID Token", http://www.is.mcgill.ca/minerva/Security/securid_token.htm, (Jun. 3, 2003).

"Baye's Theorem—Wikipedia", http://web.archive.org|web/20031204023001/http://en.wikipedia.org|wiki|Bayes'_theorem.

\* cited by examiner

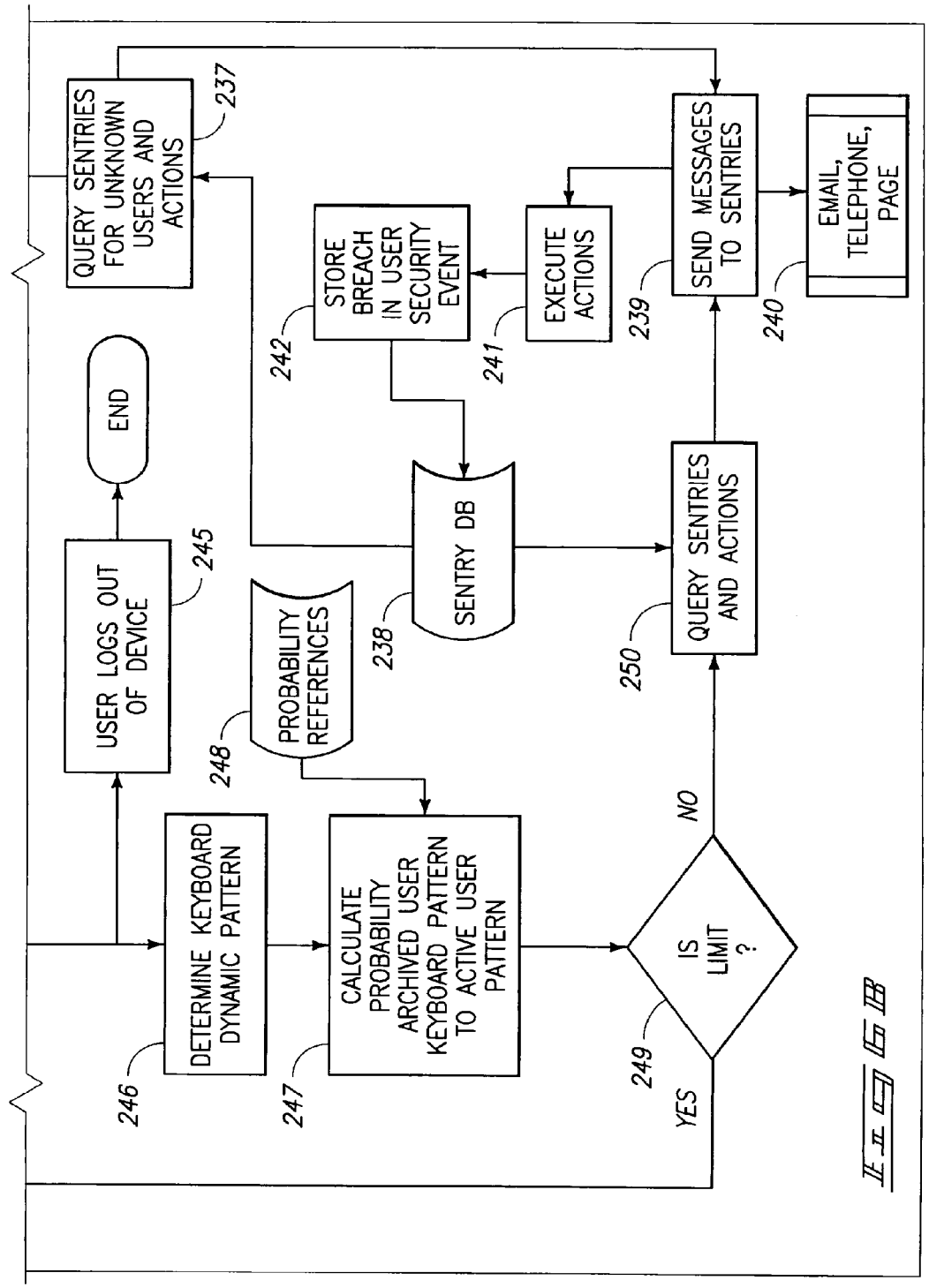

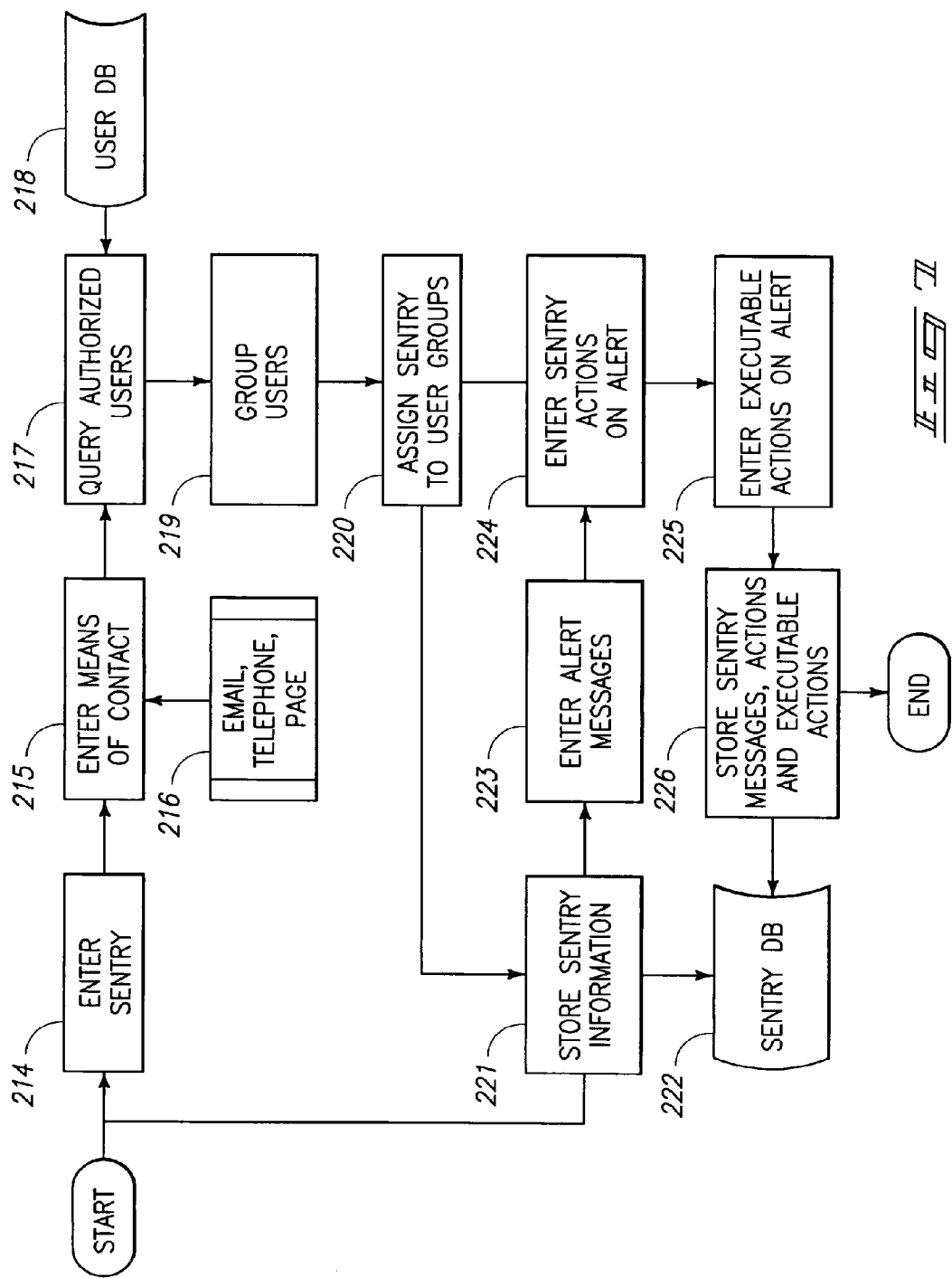

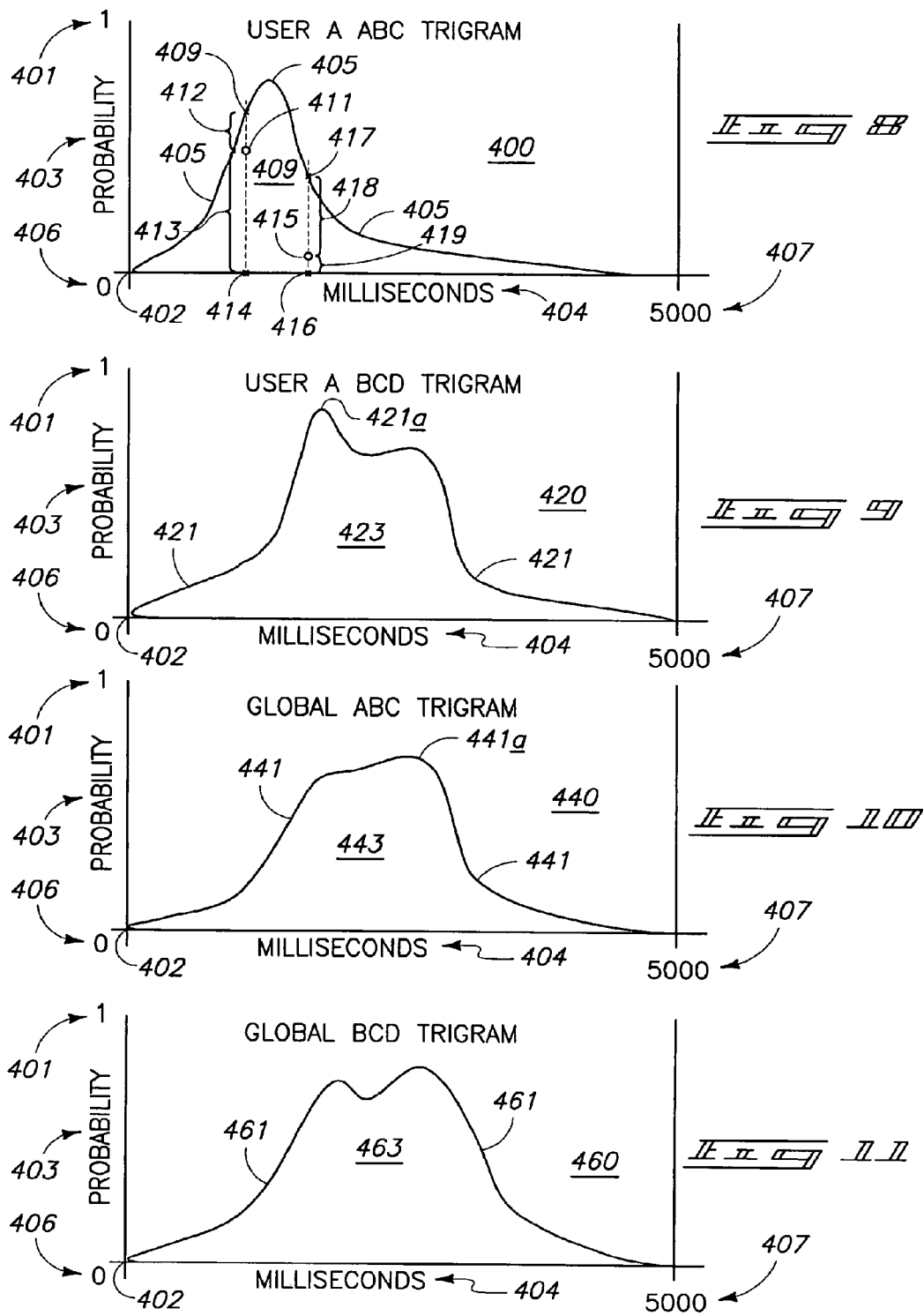

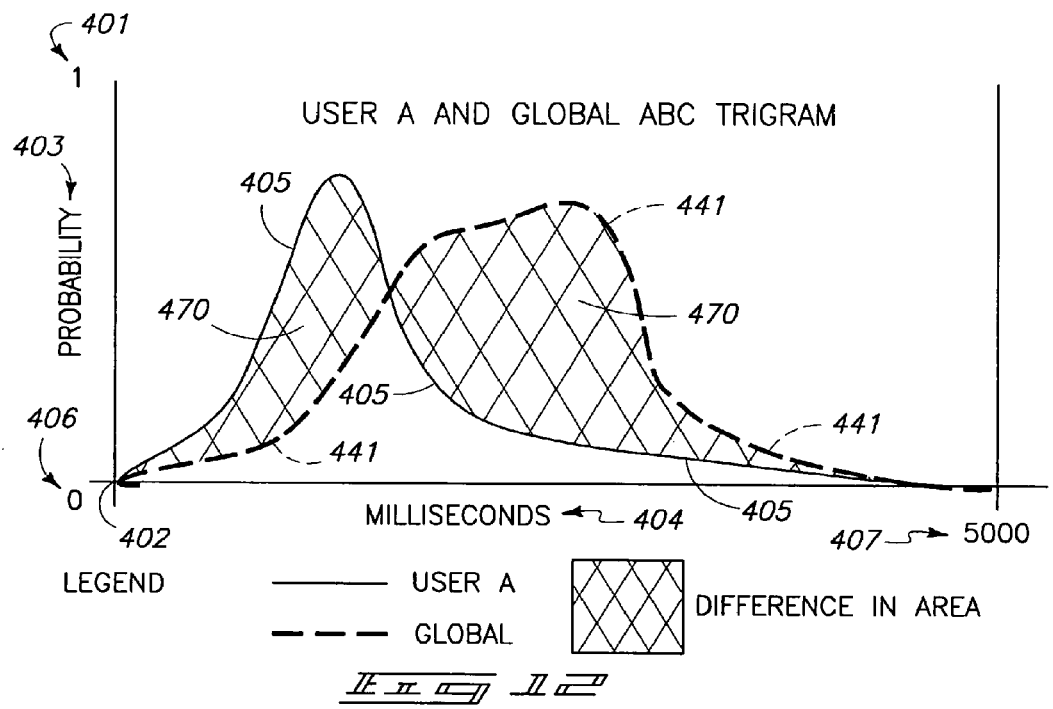
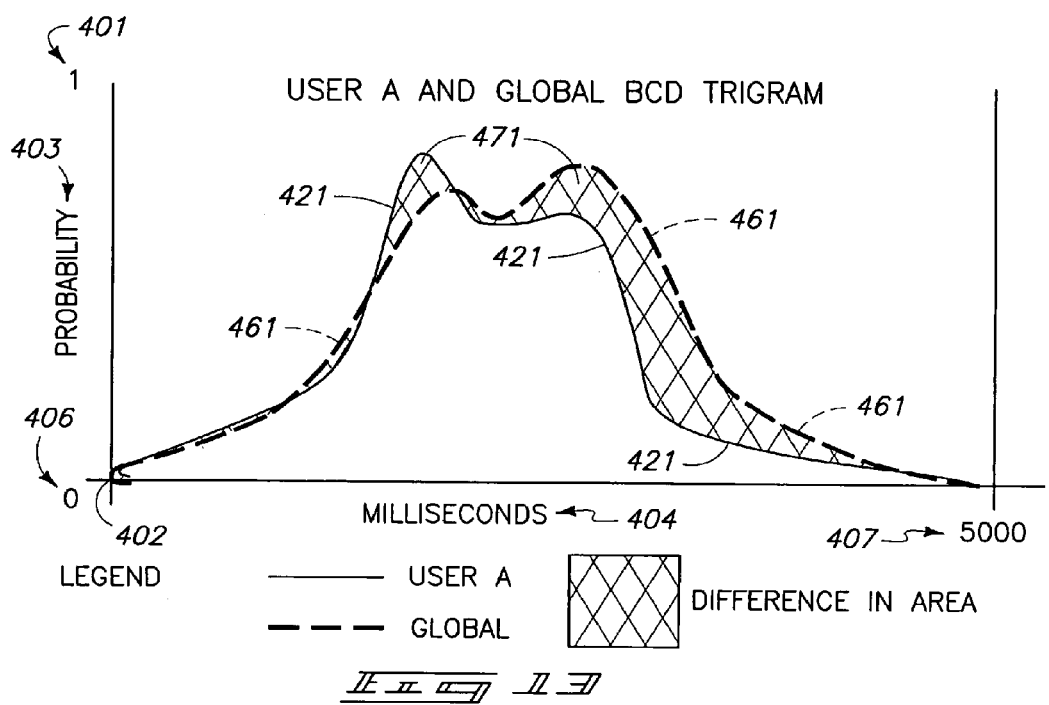

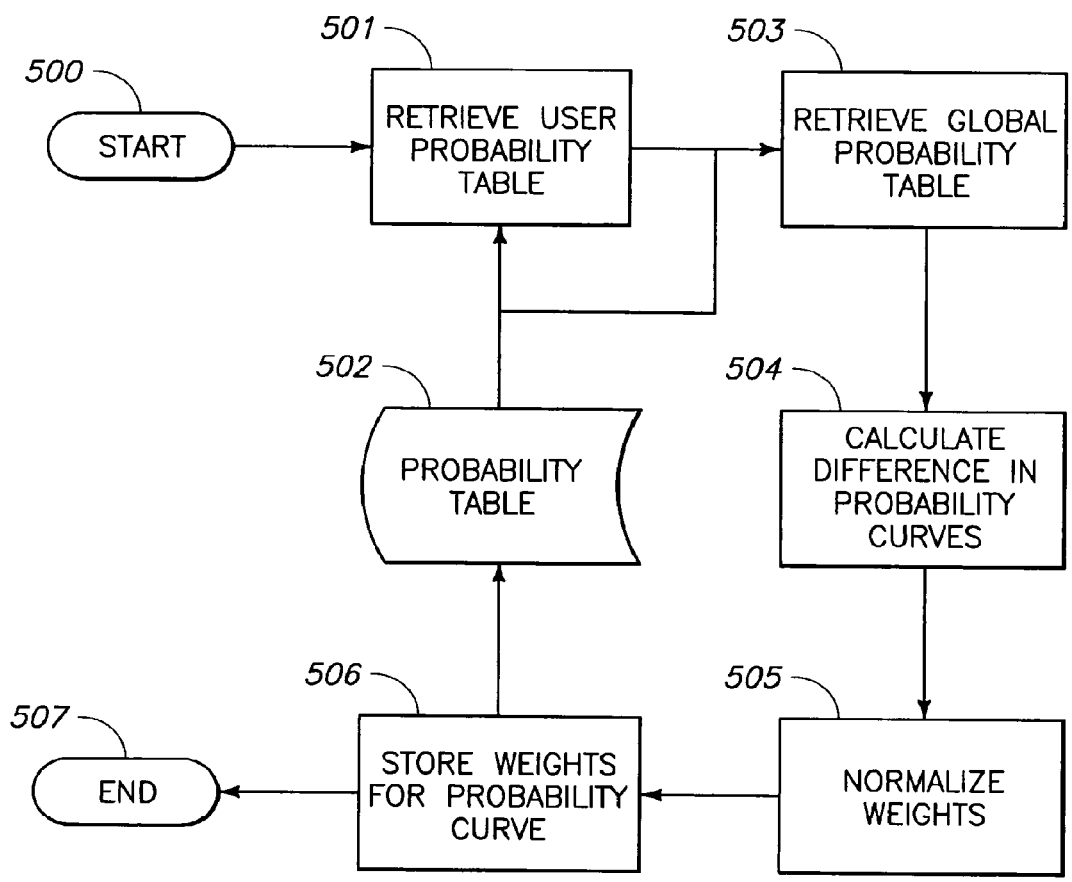

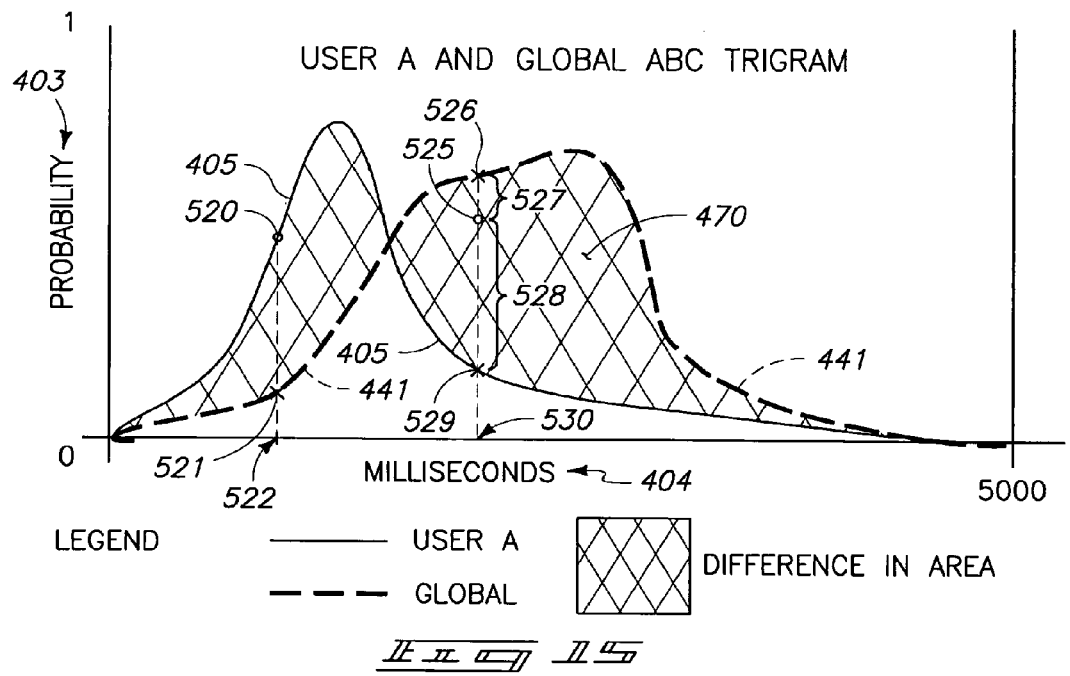
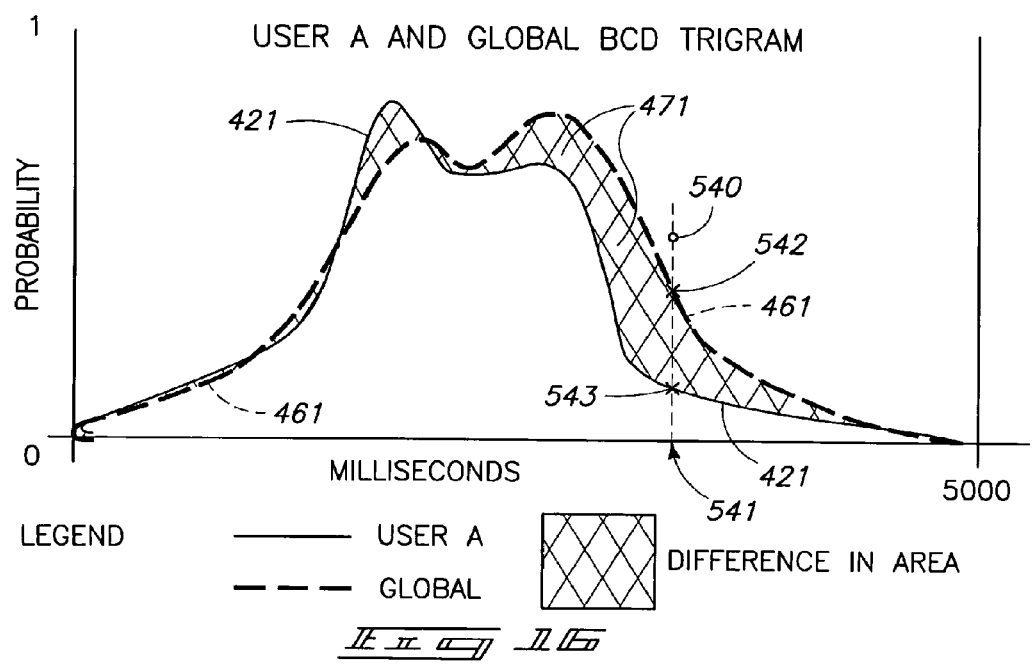

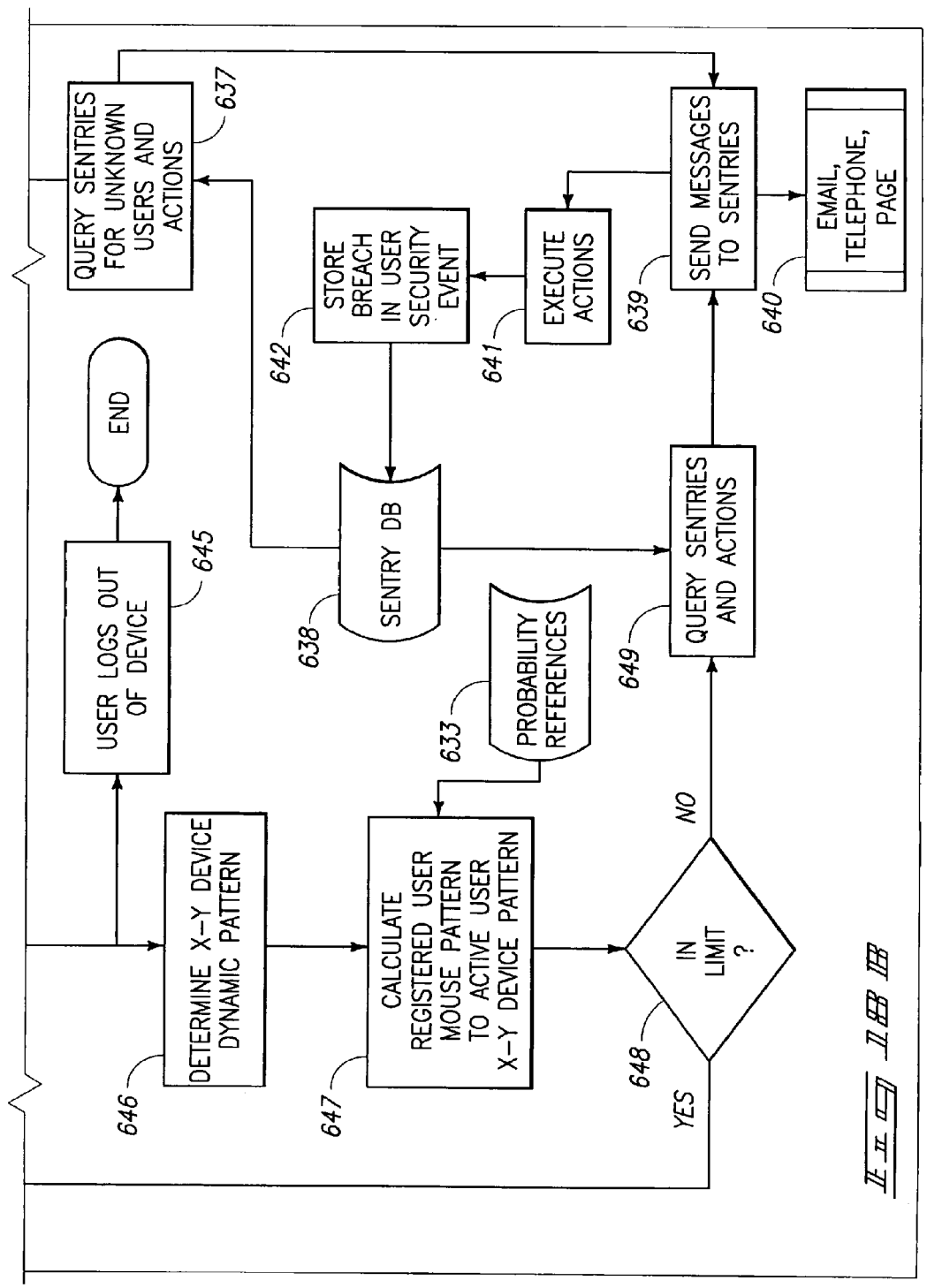

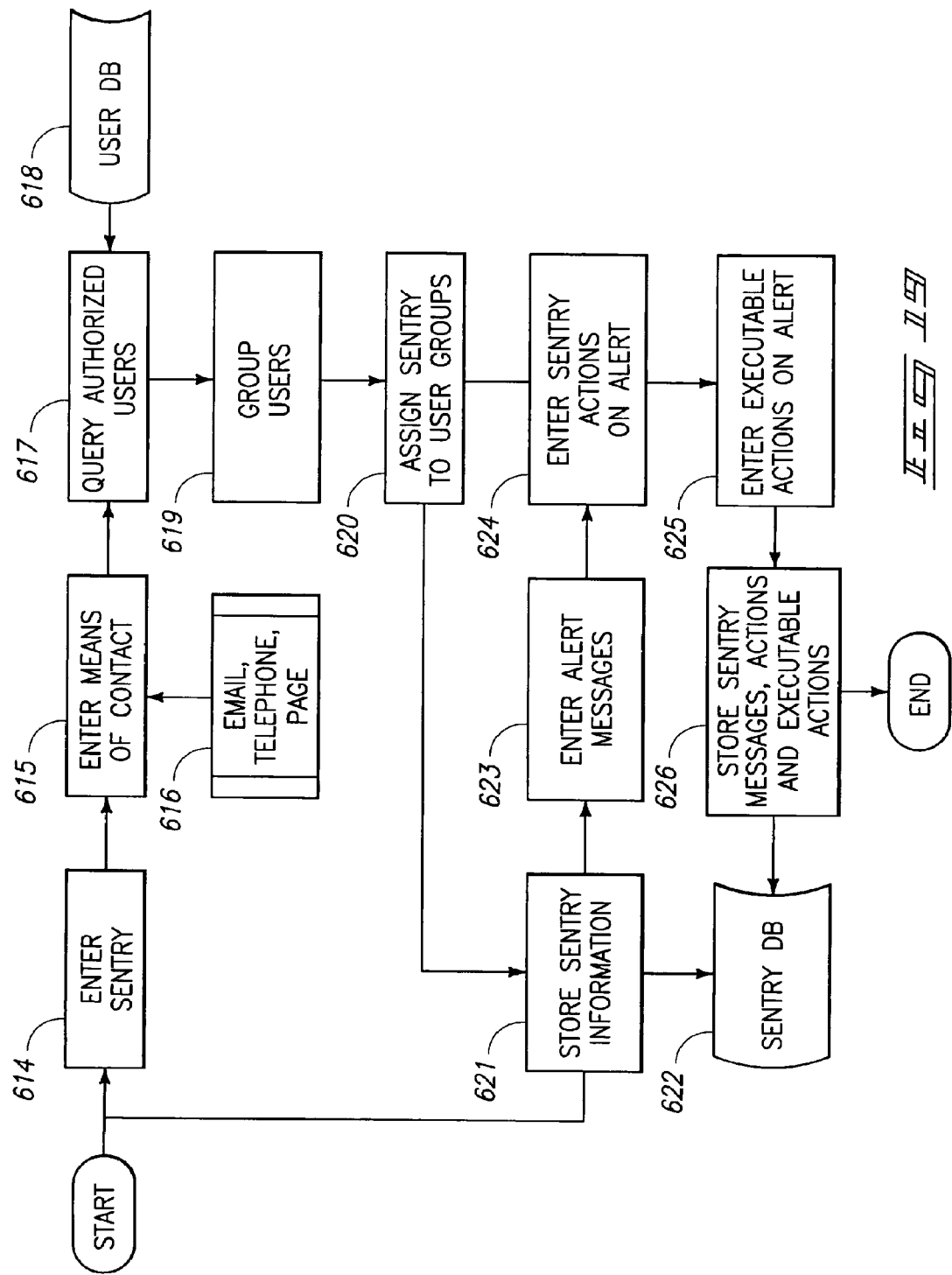

SYSTEM AND METHOD FOR USER AUTHENTICATION

CROSS REFERENCE TO RELATED APPLICATION

This application is a continuation of U.S. patent application Ser. No. 11/818,885, filed Jun. 14, 2007, which is herein incorporated by reference, and claims priority to U.S. Patent Application No. 60/813,556, filed Jun. 14, 2006, and U.S. Patent Application No. 60/813,557, filed Jun. 14, 2006, which are herein incorporated by reference.

FIELD OF THE INVENTION

This invention relates to user authentication system for determining a probability that a purported authorized user of a system is in fact the authorized user of the system. More particularly, this invention utilizes data from keyboard or similar devices and/or from X-Y devices such as a computer mouse or a touch pad, to provide ongoing or real time data to be compared with authorized user data and/or wide population data to determine a probability that the purported authorized user is in fact the authorized user.

BACKGROUND OF THE INVENTION

Many devices and systems use a keyboard or similar terminal as a user interface to access the device or system. Keyboard terminals are generally hardware devices or user interfaces that emulate typewriters, but they are also keypads on cellular telephones, portable devices such as PDA's and touch screen devices, tablet computers, or other devices that use a touch screen for key entry. These types of devices with the user interfaces may for example be a computer or electronic machine that generally requires any type of input such as alphanumeric input, but keyboards are not restricted to having alphanumeric keys.

Typically when accessing these electronic devices some sort of means of authentication is desired or preferred, and a common such authentication is for an authorized user to be assigned a password or PIN (Personal Identification Number) to allow them to access and use of the device. Other types of systems may also desire to require or provide authentication, such as some computer software applications, which may for example require a password to allow an authorized user to enter the application on the computer it resides, or to enter certain more secure portions of the software or data.

While passwords provide some protection, passwords and other unique names such as user names, may also be a vulnerable point of security access due to any one of a number of different factors, such as poor choice of user-defined passwords, stolen passwords, lost passwords or the user exposes the password to an unauthorized party.

In response to the vulnerability of passwords, the industry has incorporated secondary devices such as electronic signatures, smart cards, and biometric devices: fingerprint and retinal scanners, etc., thus requiring the user to log into the system via redundant, multiple and/or varied means. An added safeguard in software applications is to force a user to re-enter the access devices at certain intervals or at certain points-of-entry. These devices and mechanisms however cannot prevent an unauthorized user from stealing the secondary devices or from preventing a criminal party from forcing the user to enter the password and/or secondary devices at any given time. None of these methods will protect the system, if the authorized user leaves the keyboard without properly logging out of the system, thus leaving the system open to any bystander or passing unauthorized party.

At the keyboard, statistical dynamics of the keyboard typing/entry are unique to the user, with some dynamics more unique than others. Therefore, the dynamics of the authorized user's use of the keyboard and components thereof, provide a way of identifying a probability that the purported authorized user is in fact the authorized user. This dynamic use unique to or indicative of a particular person may also be referred to as a statistical signature of the authorized user at the human device interface. The ongoing dynamic use of the user interface such as the keyboard or X-Y device provides real time, continuous data which may be utilized to authenticate the user. In the scenario that an unauthorized party would gain access to a system with keyboard entry under an authorized user's identity, the keyboard dynamics may then be utilized to expose the immediate user, or the purported or alleged authorized user, as probably not being the authorized user whose identity was used to gain access. In the scenario of the user leaving the system open to access without logging out, then a new individual who begins to use the keyboard would then be detected as probably not being the registered user. In either case, the attempted unauthorized access may be identified in a real time, continuous fashion, by embodiments of this invention. Prior art focused on the timing of the keystrokes as the identifying behavior of the user.

Embodiments of this invention may also provide a way to account for and sense varying data for a specific authorized user, such as for instance a different authorized user profile when the authorized user is engaging in the measurable dynamics or characteristics at different times of the day, length of time the authorized user has been accessing the system, under different stress or fatigue levels, or any one of a number of different ways there can be a measurable and predictable variance in the data. The timing of the keystrokes, or any one of a number of other different measurable data of the use of the keyboard may provide a probable way to identify a particular user, but it is relatively limited to that type of analysis.

Identifying and knowing the user of a computer is a desirable aspect of computer and software application security. Computer and software applications maintain different levels of security which have been breached in any one of a number of different ways, such as by stolen passwords, stolen smart cards, means of spoofing biometric devices, etc. If access to the computer is left open by an authorized user, passersby or bystanders then have ready access to the computer or open software application. The computer or software application on a network of devices needs to be able to define accurately the current user of said computer or software application.

This invention provides for the authentication of a user via the keystroke typing behavior of the authorized user, or by the X-Y device movement or dynamics of the authorized user. Unlike other biometric devices, it is non-intrusive and adaptable to changes in the user's behavior. The keyboard dynamics and/or X-Y device dynamics system provided by this invention is relatively scalable through the use of probability distribution representations, which in some examples or embodiments, may provide scales relative to 0(1) number of users in calculating the likelihood the user is the authorized user. Other implementations scale to n or $n^2$ number of users. Embodiments of this invention may also provide a means to notify security sentries and execute programmed actions upon a breach in security based on the keyboard dynamics.

An object of some embodiments of this invention is to provide a user authentication or identification system using data related to mouse dynamics to determine if it is probable that the data is indicative that the purported authorized user is actually the authorized user, based on the chosen data characteristic (which in some aspects of the invention may be like a signature) for the authorized user.

Probability distribution representations may be used in embodiments of this invention to identify if the purported or alleged authorized user is in fact the authorized user. Calculation and/or algorithms may be utilized to calculate the likelihood the alleged authorized user is the legitimate authorized user who has been authorized to access the system, account or device. The probability distribution representations provide a fast, adaptable and scalable mechanism for discerning legitimate users from illegitimate users. Embodiments of this invention may also provide a system to provide security alerts to, or notify, sentries when the system determines that it may be probable that the new or purported authorized user may not in fact be the authorized user. In some aspects of this invention, the security notification mechanism may provide a more proactive notification and security system to better secure the system to which it is being applied.

It is also an object of some embodiments of this invention to provide a more scalable system for verifying the identity of an identified user, user group or class of users.

It is an object of some embodiments of this invention to provide a system for determining which of a plurality of identifying data points provide better identification of an authorized user, user group or class of users.

While the invention was motivated in addressing some objectives, it is in no way so limited. The invention is only limited by the accompanying claims as literally worded, without interpretative or other limiting reference to the specification, and in accordance with the doctrine of equivalents.

Other objects, features, and advantages of this invention will appear from the specification, claims, and accompanying drawings which form a part hereof. In carrying out the objects of this invention, it is to be understood that its essential features are susceptible to change in design and structural arrangement, with only one practical and preferred embodiment being illustrated in the accompanying drawings, as required.

BRIEF DESCRIPTION OF THE DRAWINGS

Embodiments of the present invention will now be described, by way of example only, with reference to the following drawings in which:

FIG. 7 is an exemplary flowchart illustrating an embodiment of this invention, wherein the sequence of steps employed to configure a system to compare keyboard dynamics of a purported authorized user to the authorized user probability distribution representation, notifying the proper sentries of a probability as to whether the purported authorized user is the authorized user;

FIG. 8 is a graphic representation of one embodiment of a probability distribution representation for keystroke timings of a user typing keystrokes ABC;

FIG. 9 is a graphic representation of one embodiment of a probability distribution representation for keystroke timings of a user typing keystrokes for the key combination of BCD;

FIG. 10 is a graphic representation of one embodiment of a probability distribution representation for keystroke timings of a wide population demographic user group typing keystrokes for the key combination of ABC;

FIG. 11 is a graphic representation of one embodiment of a probability distribution representation for keystroke timings of a wide population demographic user group typing keystrokes for the key combination of BCD;

FIG. 12 is a graphic representation of one embodiment of a probability distribution representation for a user typing the keystrokes ABC illustrated in FIG. 8, overlaid on the embodiment of the probability distribution representation for keystroke timings of a wide population demographic user group typing keystrokes ABC illustrated in FIG. 10;

FIG. 13 is a graphic representation of one embodiment of a probability distribution representation for a user typing the keystrokes BCD illustrated in FIG. 9, overlaid on the embodiment of the probability distribution representation for keystroke timings of a wide population demographic user group typing keystrokes BCD illustrated in FIG. 11;

FIG. 14 is an example of a flowchart of an embodiment of this invention illustrating one possible sequence for constructing a biased scoring system using a characteristic data of an authorized user;

FIG. 15 is the graphic representation of one embodiment of a probability distribution representation as illustrated in FIG. 12, and further wherein a couple of exemplary data characteristics for a purported authorized user are applied into the probability distribution representation to determine a probability as to whether the purported authorized user is the authorized user based on the data of typing the keystrokes ABC;

FIG. 16 is the graphic representation of one embodiment of a probability distribution representation as illustrated in FIG. 13, and further wherein a couple exemplary data characteristics for a purported authorized user are applied into the table to determine a probability as to whether the purported authorized user is the authorized user base on the data of typing the keystrokes BCD;

FIG. 19 is an exemplary flowchart illustrating an embodiment of this invention wherein the sequence of steps employed to configure a system to compare X-Y device dynamics of a purported authorized user to the authorized user probability distribution representation, notifying the proper sentries of a probability as to whether the purported authorized user is the authorized user;

DETAILED DESCRIPTION OF THE PREFERRED EMBODIMENTS

Figure 1:
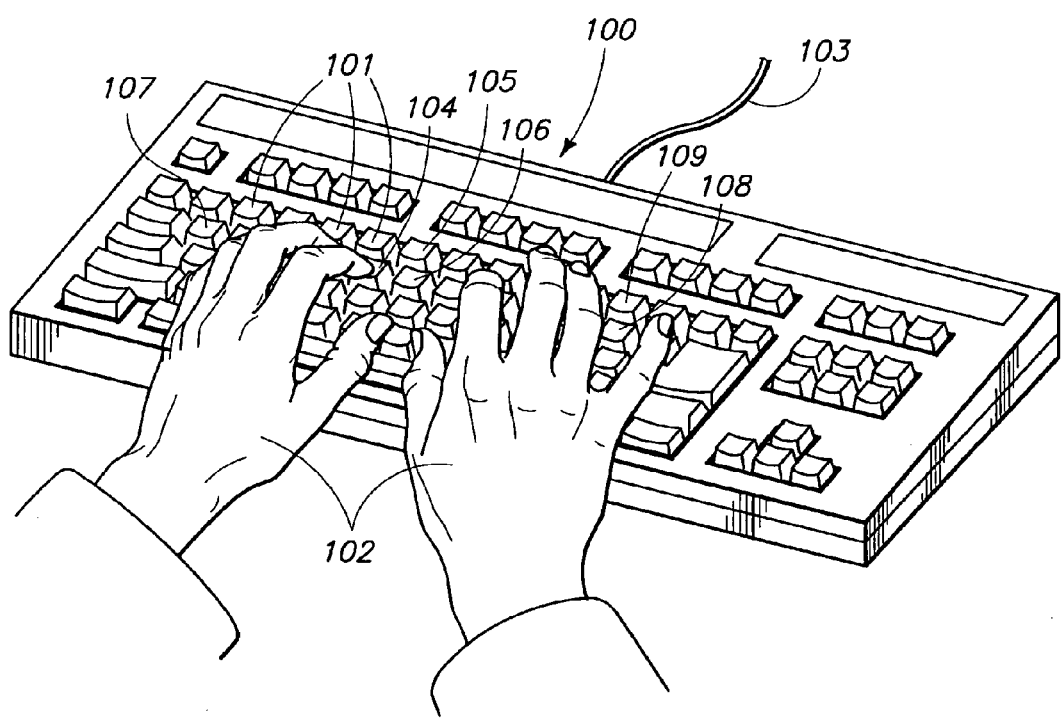
FIG. 1 is a perspective view of a user keying on a traditional keyboard.

The term "data" as used herein may be any individual or group of data, data points or items, from any one of a number of sources and may be any one of a number of different types of data. Data for example may be a sensed data or grouping of individual data points, or a measurement of most anything that can be measured, preferably related to behavior or distinguishing characteristics. Some examples of data may include information, parameters, keystroke dynamics, X-Y device dynamics, events, characteristics, facial movement, eye movement, facial profile, data points, groups of data points or characteristics, inputs, signals, etc.

When the term "accessing" is used in connection with accessing data or accessing characteristics or accessing other items, it is not limited to accessing data or information from outside the processor, but instead would include all such items accessed within the data processing apparatus or system, or from sources external to the processor.

It will also be appreciated by those of ordinary skill in the art that data may also be a grouping or combination of any of the foregoing. As one example, data points from keystroke dynamics from a user typing keys and keyboard or key-based interface, the timing of keying of keystrokes or keystroke combinations, may be measured for example for a series of keystrokes such as typing the keys ABC or BCD.

In some aspects of this invention, data is obtained by taking measurements from an X-Y device, for example measuring the speed at which a user moves a computer mouse, or the location area where a user tends to leave the computer mouse in the rest position, or the trajectory which the user tends to follow in moving a computer mouse (or the user's finger on a touchpad input device to electronic system, or on a tablet computer). Another example may be wherein data such as the pressure which a user asserts on a tablet computer user interface (e.g. a screen), which in some examples includes sensing pressure on a scale of zero to fifty-six.

The phrase "probability distribution representation" may be a behavioral record, which may, but need not be, related to frequency of an identified behavior, component of behavior, measurement of behavior or other data point. It will be recognized by those of ordinary skill in the art that these tables may come in numerous shapes, forms, configurations, scales and may include singular measurements, groupings of measurements, groupings of data, or any other individual data points or items, which may provide identifying information for comparison, or for distinguishing a particular identified or authorized user. Examples of probability distribution representations may be probability tables, histograms, bar graphs, frequency records, event counts, profiles, records, lookup tables, probability lookup tables, behavioral profiles, bar graphs, distribution functions, or others, all within the contemplation of this invention. There may be different ways to visually represent a probability distribution representation, such as more as a bar chart, curve, smoothed curve, series of data points represented graphically, a histogram or others, with no one in particular being required to practice this invention. Known techniques may be utilized to create or smooth or alter the curve and/or data representation.

When the term "authentication" is used herein, it may be broader than its traditional definition in that it may refer at least in part to identify, identification, authorizing, authenticating, labeling, associating, or fingerprinting the data to an identified or authorized user for any one of a number of different purposes. Examples of purposes for which authentication is desired may be authenticating that the person possessing a password and entering into an online account is the person or authorized user whose profile is recorded and the person that is authorized to enter that count. For instance if keystroke dynamics or keystroke data provides the measurable or ascertainable data, then a comparison of the users keystroke dynamics to the probability distribution representations for that user in the global probability distribution representations for that keystroke dynamic would be compared in order to verify a probability that the purported or alleged authorized user is the identified user or authorized user.

When the term or phrase "authorized user" is used herein, it means not only a single user, but may also include a class, group or demographic of users all within the meaning of the phrase "identified user." For example, it may include persons within an accounting group at a corporation who have access to a computer or electronic system or network; or it may include a group of people classified together because they are all left-handed, wherein this invention is not limited to any one in particular.

The term "global" in relation to a probability distribution reference or references may also be referred to as a wide population reference, for which there is no particular number or quantity of data points blended, but which will depend upon the circumstances. In most if not all cases the wide population data will include more than a sample of one since the one data point would be from the current purported authorized user.

Embodiments of this invention are methods and apparatus configured to receive, which may in some examples mean a system is configured to receive, collect, capture, sense or parse data, and then to process or utilize said data as further described herein.

Embodiments of this invention may provide a desired advantage of being more scalable than other systems, in that substantial or even massive amounts of data, characteristics, information or other measurable input data may be incorporated into one or more probability distribution representations or histograms to provide a single or a small number of probability distribution representations against which to compare the new information with. This means that massive information such as gathered over the World Wide Web or Internet may be distilled into one or relatively few probability distribution representations against which the data can be quickly compared to determine if it is more probable than not that the purported authorized user, is in fact the authorized user. The system designer adapting embodiments of this invention to a given application will have many options in determining what type of probability distribution representation to construct, the data to best distinguish the distinguishing characteristic, and further in defining the universe of data that may be combined to comprise the probability distribution representation, to optimize the ability to distinguish a user, or to authenticate the authorized user.

Embodiments of this invention may but need not necessarily include an adaptive, scalable method to acquire a behavioral signature for a user of a system who utilizes a keyboard. These embodiments of this invention may for instance accomplish this by tracking a pattern of keyboard dynamics made by the user. This keyboard dynamic pattern becomes a signature for the user and can be used to determine if the user at the keyboard is the same user registered as the current user via other electronic means such as a password or smart card, etc. The system defines the means to record the pattern, track the users at the keyboard terminal and notify proper authorities when the user at the keyboard is determined to be different from the user who is registered as the active user at the keyboard.

As fingerprints identify individual people, so does certain keyboard dynamic or other data identify an individual. Keyboard devices may render an identifiable signature related to the typing of the keys. This data or characteristics of use may be used in similar fashion, such as utilizing the pattern with which the user interfaces with or used the keyboard or parts thereof. This may in one example consist of measuring the hold time of keys and/or the timing of the keystrokes. The pattern of certain keystrokes may be sufficiently individualistic or unique to each individual due to any one of a number of different factors, such as for example the relationship between the timing of keystrokes between keys and to the length of their arms, fingers, size of arm and finger strength, as well as familiarity with the keyboard. For another example, users may have different timing between keys "a" and "x" on a Standard English keyboard. The set of the differences between the keys may yield a set of keystroke relationships for determining the probability that a particular user is at a keyboard. The pattern of timing between the keys may then become a unique identifier or signature of sorts, of the user.

Embodiments of this invention may therefore include the establishment of measurements and places probability profiles on the keyboard dynamics of any chosen n-gram measurement. The measurements may pertain to and are not restricted to the hold time of a keystroke, the timing between keystrokes, or the total time to produce an n-gram measurement of keystrokes. The n-gram measurement can be a single key, two keys to n keys to acquire the measurement. For example, a trigraph would capture sets of three keys to determine the measurement.

To establish the probability profile of a user, the system captures the keyboard events and the frequency of the keyboard events produced by the user and stores the results. Table 1 illustrates an example event table for a trigraph. The system stores the three successive keys as a timing event in milliseconds and the corresponding frequency of occurrence. These measurements then yield a user profile.

TABLE 1

Trigraph User Timing Events of Keystroke Collections

| User A Tri-graph | Time (milliseconds) | | | | | | | |
|---|---|---|---|---|---|---|---|---|
| ABC | 0 | 100 | 101 | 102 | ... | 450 | ... | 5000 |
| frequency | 0 | 4 | 0 | 2 | ... | 50 | ... | 0 |
| BCD | 0 | 100 | 101 | 102 | ... | 320 | ... | 5000 |
| frequency | 0 | 2 | 1 | 5 | ... | 35 | ... | 0 |

Once the system sufficiently captures the user profile, the system calculates the user probability distribution representation by applying a general kernel function, $K_h(x)$, which smoothes the measured data into a density estimator, given by:

$$K_h(x) = 1/h\, K(x/h),$$

where h=bandwidth, and
K=Uniform, Triangle, Quartic, Gaussian, Cosinus, or etc. kernel function.

The parameter, h, determines the smoothness of the estimation. When h approaches zero (h→0), the kernel estimation is less smooth, and when h approaches infinity (h→∞), the kernel estimation is very smooth. The kernel function, K, can be any kernel estimation function where the $\int K(x)dx=1$. Table 2 illustrates the calculation of the likelihood for each keyboard event. Once trained for a user, when a keyboard event occurs, the system returns the likelihood value for that user.

TABLE 2

User Probability Distribution Representation.

| User A Tri-graph | Time (milliseconds) | | | | | | | |
|---|---|---|---|---|---|---|---|---|
| ABC | 0 | 100 | 101 | 102 | ... | 450 | ... | 5000 |
| Likelihood | 0.00 | 0.02 | 0.01 | 0.01 | ... | 0.26 | ... | 0.00 |
| BCD | 0.00 | 100 | 101 | 102 | ... | 320 | ... | 5000 |
| Likelihood | 0.00 | 0.01 | 0.01 | 0.02 | ... | 0.20 | ... | 0.00 |

To make the probability distribution representation more adaptive, more parameters and training can be tied to the probability distribution representation, such as time of day or type of application. The size of the user probability needs only to be as large as the typing key space for the user. In the case of username/password typing behavior where no further authentication is considered, then the user probability distribution representation needs to contain only the n-gram measurements for the user's username/password set. In the case of continuous authentication of the user, then the user probability distribution representation needs to contain the entire set of possible n-gram measurements.

To establish the probability profile for an impostor, the system establishes a global probability distribution representation, which stores the probability profile of the other users to determine the probability the typist is an impostor and not the alleged user. As done for the user probability distribution representation, the system captures the user's keyboard dynamics and stores the timing and frequency of events. The results are smoothed using a general kernel function to establish a kernel density estimator. The estimator calculates the likelihood that the typist belongs in the global set of users versus the user profile. As in Tables 1 and 2, similar tables are constructed for the global probability distribution representation as illustrated in Tables 3 and 4.

TABLE 3

Trigraph User Timing Events of Keystroke
Collections for the Global Set of Users.

| Global Tri-graph | Time (milliseconds) | | | | | | | |
|---|---|---|---|---|---|---|---|---|
| ABC | 0 | 100 | 101 | 102 | ... | 400 | ... | 5000 |
| Frequency | 0 | 1000 | 1200 | 900 | ... | 15000 | ... | 10 |
| BCD | 0 | 100 | 101 | 102 | ... | 380 | ... | 5000 |
| frequency | 0 | 700 | 400 | 1300 | ... | 12000 | ... | 17 |

TABLE 4

Global - Wide Probability Distribution Representation.

| Global Tri-graph | Time (milliseconds) | | | | | | | |
|---|---|---|---|---|---|---|---|---|
| ABC | 0 | 100 | 101 | 102 | ... | 400 | ... | 5000 |
| Likelihood | 0.00 | 0.05 | 0.06 | 0.05 | ... | 0.21 | ... | 0.00 |
| BCD | 0.00 | 100 | 101 | 102 | ... | 380 | ... | 5000 |
| Likelihood | 0.00 | 0.04 | 0.01 | 0.06 | ... | 0.18 | ... | 0.00 |

With both the user probability distribution representation and the global population probability distribution representation, the system may then apply rules or formulas such as Bayes Rule to determine a posterior probability for the observed user is the alleged user. The posterior probability that the observed user is the alleged user, P(A|O), is given by:

$$P(A|O) = P(A)*L/((P(A)*L) + 1 - P(A)),$$

where P(A) is the prior probability the user is the alleged user and
L is the likelihood ratio.

The likelihood ratio is given by P(O|A)/P(O|I), where P(O|A) is the probability the alleged user produced the observations and P(O|I) is the probability an impostor produced the observations. Based on the threshold set for the value P(A|O), the system logs out the user or notifies a security sentry of a potential breach in security.

Determining the user signature via keyboard dynamics provides a means for establishing a system to monitor the identity of users throughout a network of electronic devices in real time. The system to monitor user identities stores the user keyboard dynamics patterns and compares the stored user keyboard dynamics with the registered user purported to be using the keyboard, thereby providing a probability the purported user is the authorized user. The sentries of the identities establish the lower limit of the probability they find acceptable for each user. Once the probability of an identity falls below this limit, the system notifies the sentries and executes any pre-defined actions that it can machine execute through automated scripts or software applications.

A means to identify a user is to track the user behavior of the X-Y device they are using, in this example what is commonly referred to as a computer mouse, or referred to as a mouse. A mouse for a computer is an input device that translates the position of a tracking ball to the position of the pointer on the computer display screen. A mouse may use a tracking ball or a light based location tracking mechanism, but other kinds of a mouse exist as touch pads, touch screens, pens, stylus, joysticks or such a device that yields an x,y or x,y,z coordinate on an electronic display screen. How the mouse is used and its placement is user specific due to the user's length of fingers, hands, arms and body position when using a mouse. When mouse activity occurs, a user can be identified by comparing the current mouse activity to a stored mouse activity pattern associated with the user. This means of identifying the user then provides a real time signature of a user, thus allowing real time user identification at a computer workstation or software application.

Embodiments of this invention define a system which senses data for or characteristics of a user of a system, generally from that user's characteristic use of an input device or a user interface, such as an X-Y device (a mouse, touchpad, etc.) by tracking data or characteristics of the pattern of mouse dynamics made by the user. This mouse dynamic pattern may become like an identifying signature for the user and can be used to determine if there is a discrepancy between the purported user and the active user mouse dynamics. The system defines the means to record the mouse dynamics pattern, identify the active users using the mouse, and notify proper authorities when the mouse dynamics are determined to be different from the user who is registered as the active user.

The patterns of mouse dynamics created by a user are unique to the user due to the user's length of fingers, hand size, length of arm and position of the mouse. The method measures the pattern by recording the cursor and mouse positions, the general resting positions of the cursor and the timing of the mouse movements and clicks. This unique pattern of mouse behavior becomes an identifiable signature for the user.

Determining the user signature via mouse dynamics provides a means for establishing a system to monitor the identity of users throughout a network of electronic devices in real time. The system to monitor user identities stores the user mouse dynamics patterns and compares the stored user mouse dynamics with the registered user purported to be using the mouse, thereby providing a probability the purported user is the authorized or identified user. The sentries of the identities establish the lower limit of the probability they find acceptable for each user. Once the probability of an identity falls below this limit, the system notifies the sentries and executes any pre-defined actions that it can machine execute through automated scripts or software applications.

To establish the probability profiles, n-gram measurements are made on the mouse dynamics. Table 5 is an exemplary n-gram table of measurements for recording the x,y resting position of the mouse, where (0,0) is considered to be the upper left corner of the terminal screen. The x,y values can represent the pixel value or any divided section of the terminal screen. Table 6 uses the measurement of speed along a chosen trajectory to record the unique mouse behaviormetrics, data or characteristics of the user.

TABLE 5

Recording the Resting Positions and Durations of the Mouse.

| User A Resting position | | | | | | | | |
|---|---|---|---|---|---|---|---|---|
| (0, 0) Time (seconds) | 0 | 10 | 11 | 12 | ... | 450 | ... | 3600 |
| Frequency | 0 | 100 | 140 | 120 | ... | 4 | ... | 6 |
| (200, 200) Time (seconds) | 0 | 10 | 101 | 102 | ... | 320 | ... | 3600 |
| Frequency | 0 | 200 | 250 | 180 | ... | 20 | ... | 2 |

TABLE 6

Recording the Speed of Mouse Movement Across Trajectories.

| User A Trajectory Vector | | | | | | | | |
|---|---|---|---|---|---|---|---|---|
| (0, 1) Speed (pixels/second) | 0 | 200 | 300 | 400 | ... | 1000 | ... | 2000 |
| Frequency | 0 | 0 | 1 | 2 | ... | 47 | ... | 80 |
| (1, 1) Speed (pixels/second) | 0 | 200 | 300 | 400 | ... | 1000 | ... | 2000 |
| Frequency | 0 | 0 | 0 | 0 | ... | 36 | ... | 175 |

Once the system sufficiently capture the user profile, the system calculates the user probability distribution representation by applying a general kernel function, $K_h(x)$, which smoothes the measured data into a density estimator, given by:

$$K_h(x)=1/hK(x/h)$$

where h=bandwidth, and
K=Uniform, Triangle, Quartic, Gaussian, Cosinus, or etc. kernel function.

The parameter, h, determines the smoothness of the estimation. When h approaches zero (h→0), the kernel estimation is less smooth, and when h approaches infinity (h→∞), the kernel estimation is very smooth. Once trained for a user, the system returns a likelihood value for that user. Table 7 illustrates the calculation of the likelihood for each mouse resting position event.

TABLE 7

User Probability Distribution Representation.

| User A Resting position | | | | | | | |
|---|---|---|---|---|---|---|---|
| (0, 0) Time (seconds) | 0 | 10 | 11 | 12 | ... 450 | ... | 3600 |
| Likelihood | 0 | 0.10 | 0.11 | 0.09 | ... 0.01 | ... | 0.01 |
| (200, 200) Time (seconds) | 0 | 10 | 101 | 102 | ... 320 | ... | 3600 |
| Likelihood | 0 | 0.20 | 0.22 | 0.19 | ... 0.01 | ... | 0.0 |

To make the probability distribution representation more adaptive, more parameters and training can be tied to the probability distribution representation, such as time of day or type of application. The size of the user probability needs only to be as large as the mouse action space for the user. In the case of continuous authentication of the user, then the user probability distribution representation needs to contain the entire set of possible n-gram measurements.

To establish the probability profile for an impostor or purported authorized user, embodiments of the invention may establish a global probability distribution representation which stores the probability profile of the other users to determine a probability that the purported authorized user is an impostor and not the authorized or alleged user. As done for the user probability distribution representation, the system captures the user's mouse dynamics and stores the timing and frequency of events. The results, if in curve format, may but need not be, smoothed user a general kernel function to establish a kernel density estimator. The estimator calculates the likelihood that the typist belongs in the global set of users versus the user profile. As in Tables 5, 6, and 7, similar tables are constructed for the global probability distribution representation as illustrated in Table 9 and 4.

TABLE 8

Global Record of Resting Positions and Times of Mouse.

| Global Resting position | | | | | | | |
|---|---|---|---|---|---|---|---|
| (0, 0) Time (seconds) | 0 | 10 | 11 | 12 | ... 450 | ... | 3600 |
| frequency | 0 | 100 | 140 | 120 | ... 4 | ... | 6 |
| (200, 200) Time (seconds) | 0 | 10 | 101 | 102 | ... 320 | ... | 3600 |
| frequency | 0 | 200 | 250 | 180 | ... 20 | ... | 2 |

TABLE 9

Global Probability Distribution Representation for the Resting Positions and Times of Mouse.

| Global Resting position | | | | | | | |
|---|---|---|---|---|---|---|---|
| (0, 0) Time (seconds) | 0 | 10 | 11 | 12 | ... 450 | ... | 3600 |
| frequency | 0 | 0.06 | 0.09 | 0.09 | ... 0.15 | ... | 0.01 |
| (200, 200) Time (seconds) | 0 | 10 | 101 | 102 | ... 320 | ... | 3600 |
| frequency | 0 | 0.10 | 0.08 | 0.07 | ... 0.18 | ... | 0.0 |

With both the user probability distribution representation and the global probability distribution representation, the system may apply a formula, rule or algorithm for example, to determine whether it is probable that the purported authorized user is in fact the authorized user. In this example or embodiment, the comparison may be made by applying Bayes Rule to determine a posterior probability the observed user is the alleged user. It will be appreciated by those of ordinary skill in the art that Bayes Rule is one of numerous ways to determine a probability here, with no one in particular being required to practice this invention.

The posterior probability that the observed user is the alleged user, P(A|O), is given by:

$$P(A|O)=P(A)*L/((P(A)*L)+1-P(A)),$$

where P(A) is the prior probability the user is the user and L is the likelihood ratio or probability ratio.

The likelihood ratio or probability ratio is given by P(O|A)/P(O/I), where P(O/A) is the probability the alleged user produced the observations and P(O/I) is the probability an impostor produced the observations. Based the threshold set for the value of P(A|O), the system may log out the user or notify a security sentry of a potential breach in security.

Determining the user signature via mouse dynamics provides a means for establishing a system to monitor the identity of users continuously throughout a network of electronic devices in real time. The system to monitor user identities stores the user mouse dynamics patterns and compares the stored user mouse dynamics with the registered user purported to be using the mouse, thereby providing a probability the purported user is the identified user. The sentries of the identities establish the lower limit of the probability they find acceptable for each user. Once the probability of an identity falls below this limit, the system notifies the sentries and executes any pre-defined actions that it can machine execute through automated scripts or software applications.

The present invention may use mouse dynamics to provide an alternative or additional factor of authentication for the user. Probability distribution representations may be constructed to determine a probability or a likelihood that a user is a legitimate user for a device or system (e.g. an individual account within the system). Embodiments of this invention may provide a system which notifies security sentries and/or others, when a new user is entering the system; and may train the probability distribution representations for the new user and to notify security sentries when an illegitimate user is using an authorized user's account or device.

FIG. 1 is a perspective view of a user keying on a traditional keyboard, showing user hands 102, keyboard 100, keys 101, and cord 103 which may attach the keyboard to a data processing apparatus, or in the alternative, the keyboard may be wireless and communicate in a wireless manner with a data processing apparatus (not shown in FIG. 1).

Some aspects of this invention may capture or access the timing of certain keystrokes as one exemplary data element, or as a characteristic. Examples given below would be for a sequence of typing the keys such as ABC, and another example referencing the typing of keys BCD. However, it will be appreciated that the typing of any key sequence may be utilized depending upon the data, and the comparisons where authentication may be sought. It will also be appreciated by those of ordinary skill in the art that any one of a different number of keys may be included within the sequence to arrive at data to be utilized in aspects of this invention. For example, in the illustration shown in FIG. 1, a key stroke sequence may be established for keys 104, 105, 106, 107, 108 and 109, which may represent a common sequence or word commonly typed or keyed by users being authenticated. Any sub-combination, reverse combination or shorter or longer combinations may also be utilized.

It will also be appreciated by those of ordinary skill in the art that because embodiments of this invention have so many different applications, the term data as used herein may constitute a multitude of different measurements, characteristics, timings or any other element that can be measured or used to distinguish different individual users, different users within identified demographics and different demographic groups, to name a few.

Figure 2:
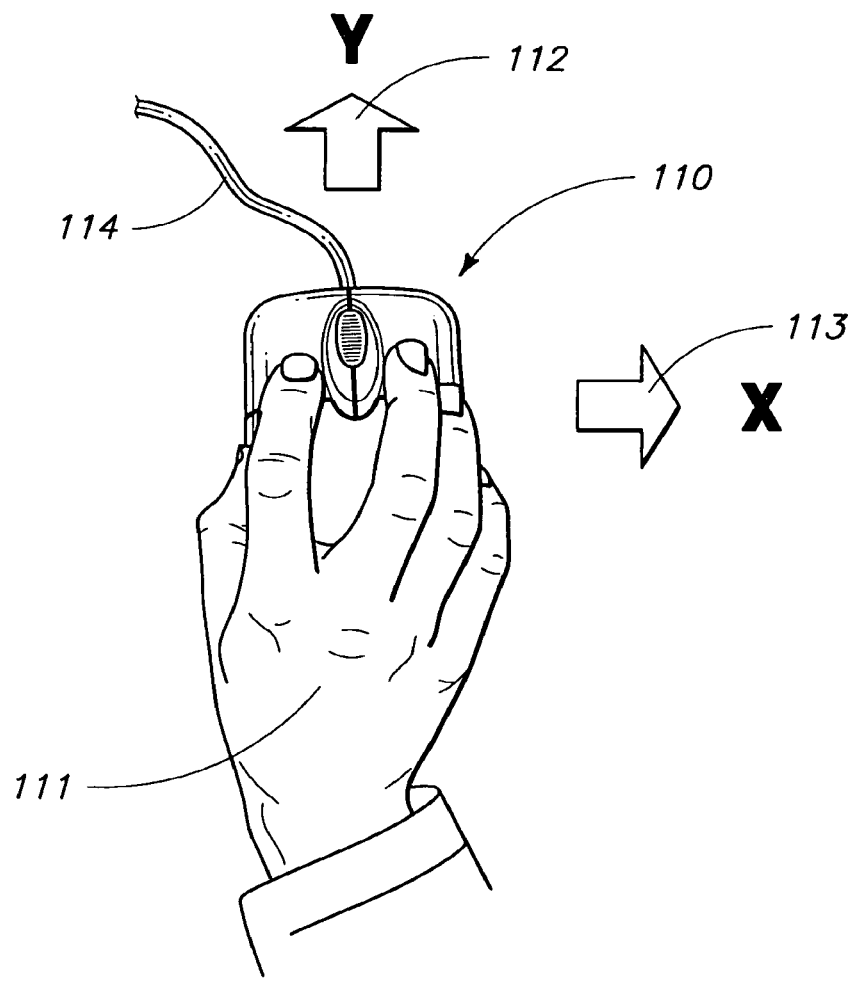
FIG. 2 is a top view of a user handling and moving an X-Y device, which in this example is a traditional computer mouse.

FIG. 2 is a top view of a user handling and moving an X-Y device, namely in this example a traditional computer mouse 110 providing the X-Y device dynamics, with connection cord 114, user hand 111, X direction movement indicated by arrow 113 and Y direction movement indicated by arrow 112.

Figure 3:
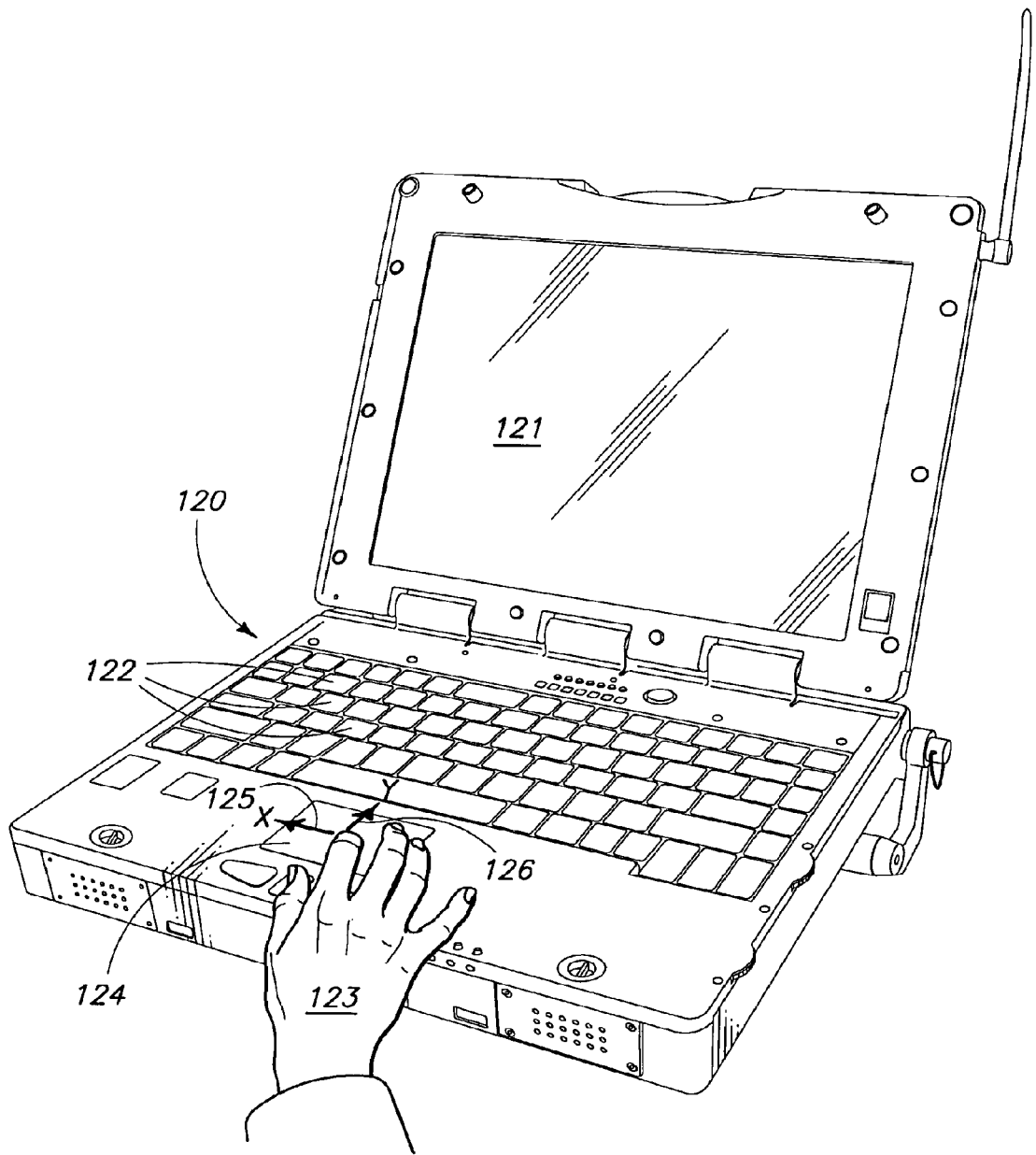
FIG. 3 is a perspective view of a user using a touch pad on a traditional laptop computer, which also includes a keyboard, the touch pad being an X-Y device which may also measure pressure applied thereto.

FIG. 3 is a perspective view of a user's hand 123 using a touch pad 124 on a traditional laptop computer 120, which also includes a keyboard, the touch pad being an X-Y device, which may or may not also measure pressure applied thereto. FIG. 3 illustrates computer screen or monitor 121, X-direction 125 and Y-direction 126 movement, and computer keys 122. It will be appreciated by those of ordinary skill in the art that the touch pad 124 is an X-Y device with X-Y device dynamics, but that it may also sense and provide data on pressure applied to the touch pad 124. The embodiments which may utilize pressure data may provide a substantial additional amount of measurable data from which distinctions can be made of users.

Figure 4:
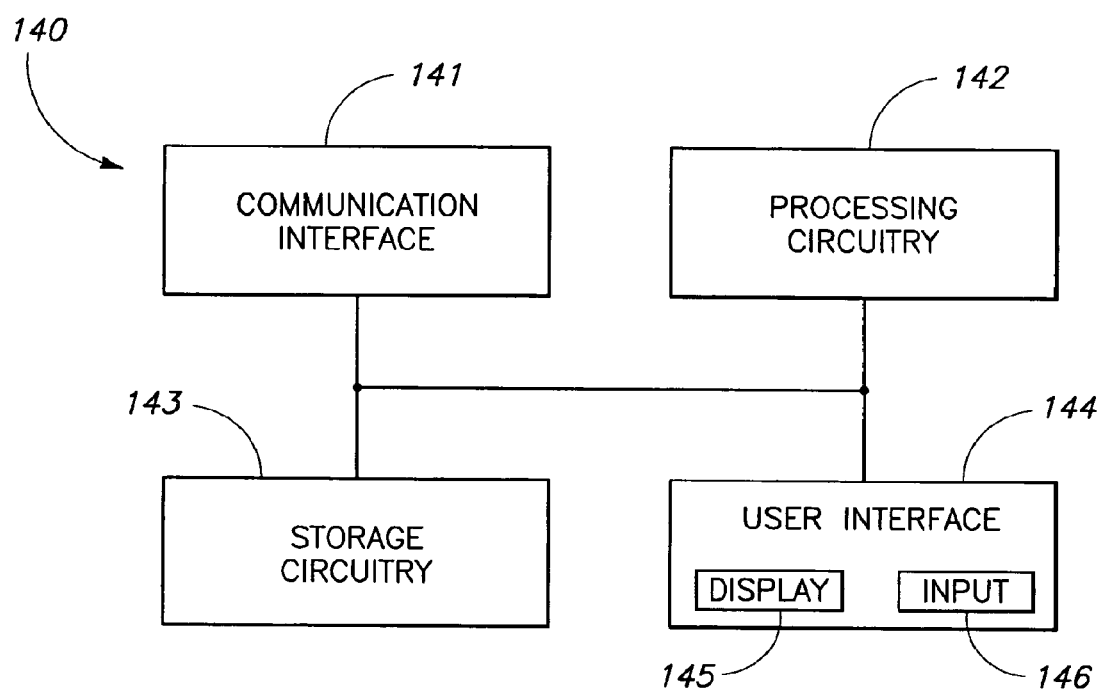
FIG. 4 is a block diagram of an exemplary data processing apparatus.

FIG. 4 is a block diagram of an exemplary data processing apparatus 140. FIG. 4 illustrates that communications interface 141 is arranged to implement communications of computing device 140 with respect to external devices not shown. For example, communications interface 141 may be arranged to communicate information bi-directionally with respect to computing device 140. Communications interface 141 may be implemented as a network interface card (NIC), serial or parallel connection, USB port, FireWire interface, flash memory interface, floppy disc drive, or any other suitable arrangement for communicating with respect to computing device 140.

In one embodiment, processing circuitry is arranged to process data, control data access and storage, issue commands, and control other desired operations. Processing circuitry 142 may comprise circuitry configured to implement desired programming provided by appropriate media in at least one embodiment. For example, the processing circuitry 142 may be implemented as one or more of a processor and/or other structure configured to execute executable instructions including, for example, software and/or firmware instructions, and/or hardware circuitry. Exemplary embodiments of processing circuitry include gloom hardware logic, PGA, FPGA, ASIC, state machines, and/or other structures alone or in combination with a processor. The storage circuitry 143 is configured to store programming such as executable code or instructions (e.g., software and/or firmware), electronic data, databases, or other digital information and may include processor-usable media. Processor-usable media may be embodied in any computer program, product(s), or article of manufacture(s) which can contain, store, or maintain programming, data and/or digital information for use by or in connection with an instruction execution system including processing circuitry in the exemplary embodiment. For example, exemplary processor-usable media may include any one of physical media such as electronic, magnetic, optical, electromagnetic, infrared or semi-conductor media. Some more specific examples of processor-usable media include, but are not limited to, a portable magnetic computer diskette, such as a floppy diskette, zip disk, hard drive, random access memory, read only memory, flash memory, cache memory, and/or other configurations capable of storing programming, data, or other digital information.

At least some embodiments or aspects described herein may be implemented using programming stored within appropriate storage circuitry 143 described above and/or communicated via a network or other transmission media and configured to control appropriate processing circuitry 142. For example, programming may be provided via appropriate media including, for example, embodied within articles of manufacture, embodied within a data signal (e.g. modulated carrier wave, data packets, digital representations, etc.) communicated via an appropriate transmission medium, such as a communication network (e.g. the Internet and/or a private network), a wired in electrical connection, optical connection and/or electromagnetic energy, for example, via a communications interface 141, or provided using other appropriate communication structure or medium. Exemplary programming including processor-usable code may be communicated as a data signal embodied in a carrier wave in but one example.

User interface 144 is configured to interact with a user including conveying data to a user (e.g., displaying data for observation by the user, audibly communicating data to a user, etc.) as well as receiving input from the user (e.g., tactile input, voice instruction, etc.). Accordingly, in one exemplary embodiment, the user interface may include a display 145 (e.g., cathode ray tube, LCD, etc.) configured to detect visual information as well as a keyboard, mouse, touch pad, and/or other input device 146. Any other suitable apparatus for interacting with a user may also be utilized, including three-dimensional interfaces, which instead of merely being on an X-Y plane may include three dimensions, namely X, Y and Z.

It will be understood that when components, apparatus, appliance, functions, steps or elements of this invention need to be or may be implemented on a data processing apparatus as a whole, or any individual component thereof described herein, that the apparatus or any individual component as described herein may be utilized within the contemplation of this invention. For instance if a flowchart as described below expressly or implicitly requires for example that a processor or storage for example be utilized, the applicable components described herein with respect to FIG. 4 may be so utilized even if not specifically recited for that step.

Figure 5:
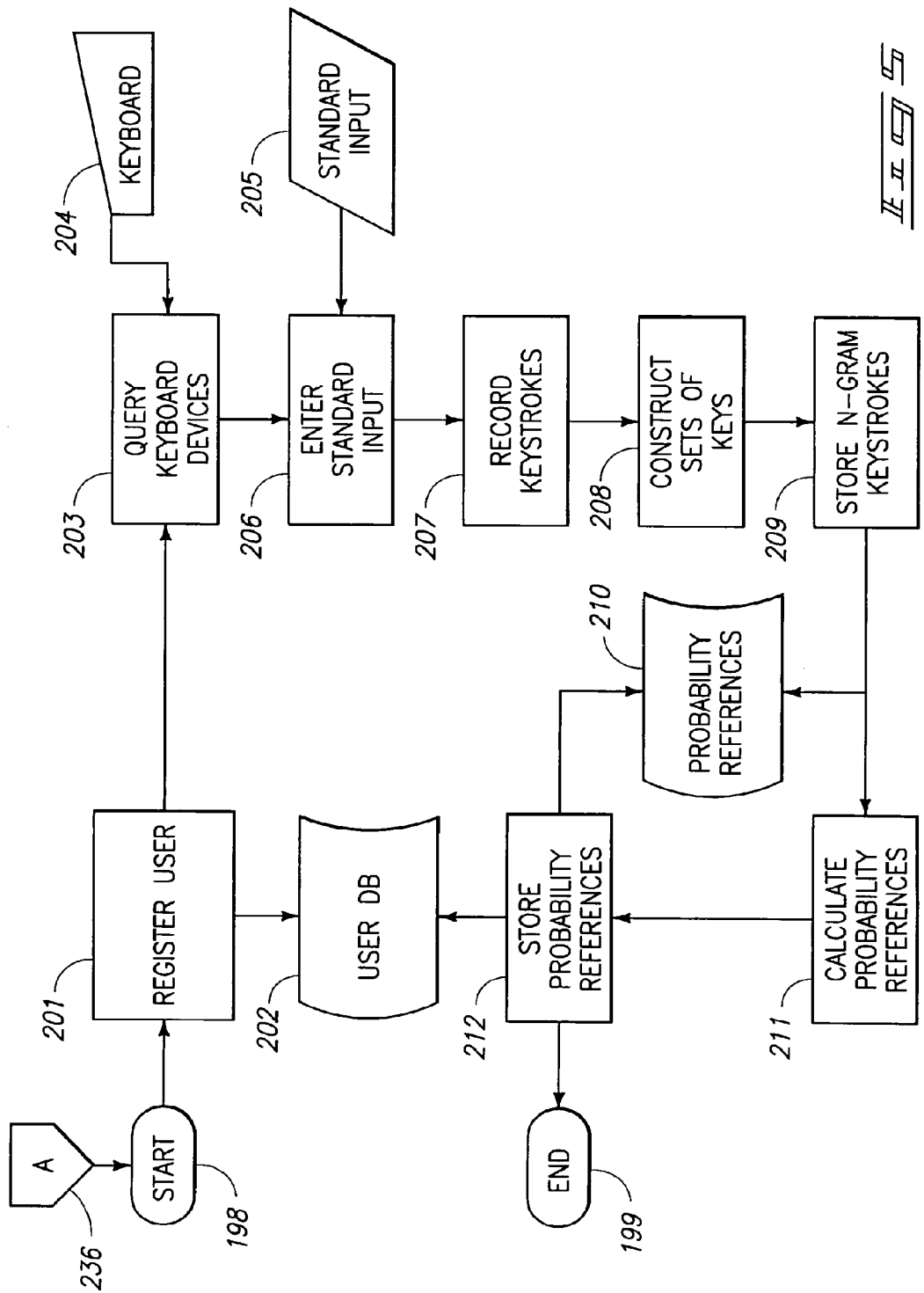
FIG. 5 is an exemplary flowchart illustrating one embodiment of this invention, wherein a sequence of logical steps are shown which may access keyboard dynamics of a user.

FIG. 5 is an exemplary flowchart illustrating one embodiment of this invention wherein a sequence of logical steps is shown which may access keyboard dynamics of a user.

FIG. 5 illustrates the process flow of the method for capturing and storing user keyboard dynamics for the purpose of authenticating an authorized user, or whether a purported authorized user is in fact the authorized user. FIG. 5 illustrates one embodiment of such a flowchart and this invention is in no way limited to any one embodiment such as the one shown in FIG. 5. The authorized user may first be identified and registered 201 in a controlled environment, or alternatively the authorized user may be surreptitiously registered at a particular keyboard on the network of electronic devices. The registered user information is stored in the registered user database 202. The system queries 203 the keyboard device 204 to determine the type of keys that reside on the keyboard device. For a computer, a keyboard is typically the key entry device and for a cellular phone they have digits and other functions as the keyboard. Keys in any format with alphanumeric or other designation may be utilized, such as key pads or others. The user enters 206 standard input 205 for the keyboard to begin recording the keyboard dynamic pattern for the user. The system may for instance record the keystrokes 207, the timing of each keystroke or combination of keystrokes, or any other measurable data from which desirable characteristics may be ascertained. The specific data may depend upon the nature of the input, the nature of the user or the specific application, with no one in particular being required to practice this invention. From this behavior, the pattern is determined by collecting the stipulated n-gram key set for the user 208 and storing the n-gram pattern as the user timing profile 209 into the probability distribution representation database 210. The keyboard behavioral profile may be smoothed to calculate the user probability distribution representation 211. The probability distribution representation is then stored for the user and their probability events are stored into the global probability distribution representation 212.

Figures 6, 6A:
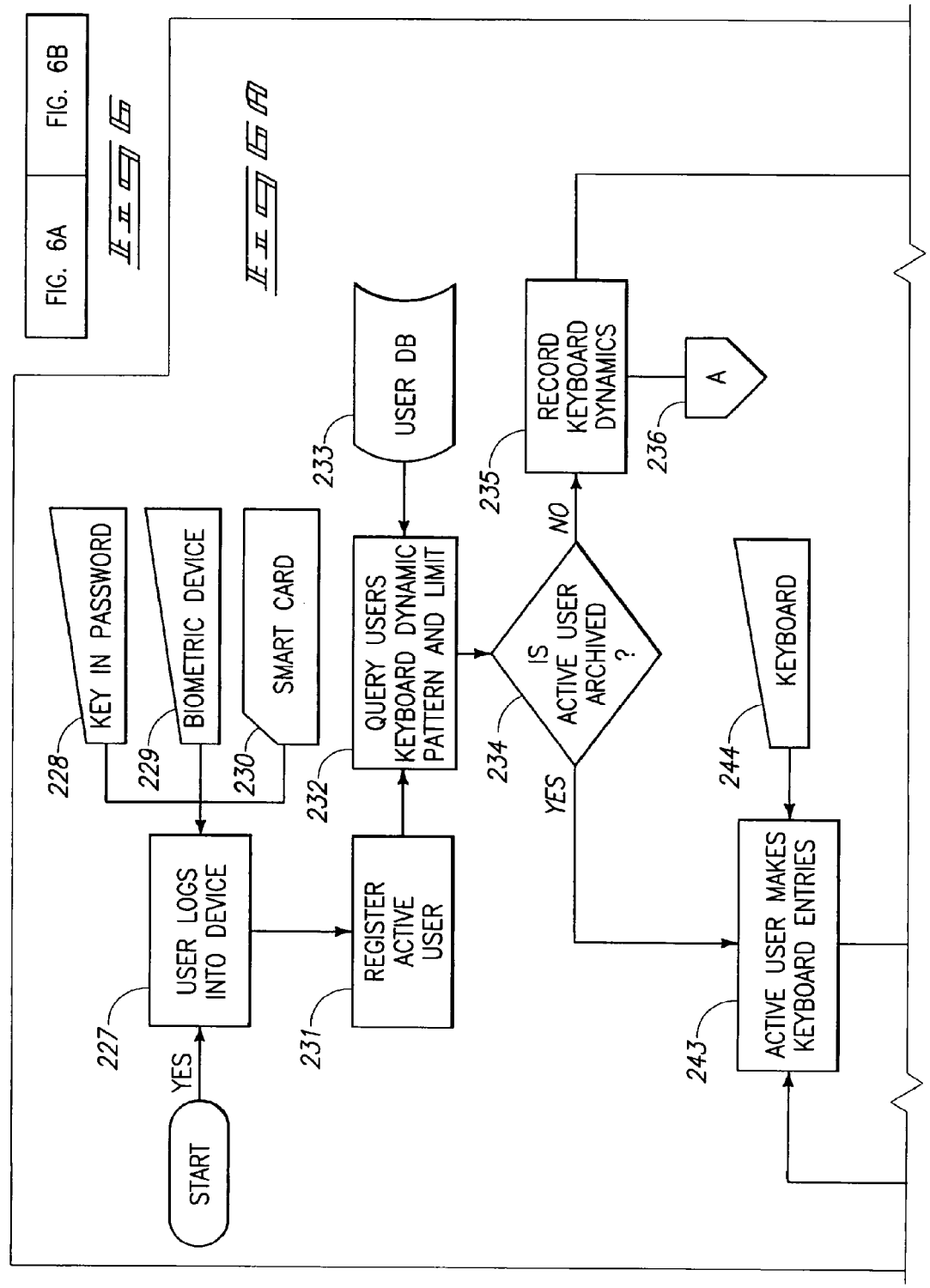
FIG. 6 is an exemplary flowchart illustrating an embodiment of this invention, wherein the sequence of steps employed to configure a system to notify the proper sentries of a probability as to whether the purported authorized user is the authorized user based on keyboard dynamics.

FIGS. 6 (A & B) are an exemplary flowchart illustrating an embodiment of this invention wherein the sequence of steps employed to configure a system to notify the proper sentries of a probability as to whether the purported authorized user is the authorized user based on keyboard dynamics.

FIGS. 6 (A & B) illustrate the process flow for identifying the users, monitoring any change in the user via the keyboard dynamics. The authorized user or purported authorized user may log into the device 227 using various means that the system provides, senses or recognizes, such as password 228, biometric 229, or smart card 230, or others all within the contemplation of this invention. The system registers the user as an active or registered active user 231. The system then queries 232 the user signature database 233 for the user's keyboard dynamics to use as the baseline comparison for user identification. If the user is not found in the user database 234, the system assumes it is a new user to the networked device. The system records the keyboard dynamics 235 as illustrated in FIG. 5, which may establish the user keyboard dynamic signature and which then stores the new signature. The system queries 237 the sentry database 238 to find the sentries responsible for unknown users 250. The sentries may then be notified 239 via the means or mechanism established for the sentries 240 to the new authorized user security event. Any executable actions associated with an unknown user are performed 241 and the system stores the event 242 into the sentry database 238.

If the user is known or an authorized user 243 the keyboard dynamics are continually recorded 244 and compared to the archived dynamics of the authorized user until the user logs out of the device 245. The continuous keyboard dynamics may be monitored 246, and the likelihood probability is calculated 247 from the probability distribution representations 248. If the likelihood probability of the keyboard dynamics for the active user drops below the user probability limit 249 the system queries 250 the sentry database 238 for the sentries of the user identified, notifies the sentries 239, executes any executable actions associated with the user 241 and stores the security event 242.

FIG. 7 is an exemplary flowchart illustrating an embodiment of this invention wherein the sequence of steps employed to configure a system to compare keyboard dynamics of a purported authorized user to the authorized user probability distribution representation, notifying the proper sentries of a probability as to whether the purported authorized user is the authorized user.

FIG. 7 illustrates the process flow for configuring the sentries, the means, device or mechanism for contacting the sentries and the corrective actions regarding a discrepancy in user identification. The sentry is entered into the system 214, and then the mechanism, device or means to contact the sentry are entered 215. The mechanism, device or means to contact the sentry 216 can be email, text messaging, telephone, paging, etc., or others, with no one in particular being required to practice this invention. The system queries the authorized user 217 from the user database to be identified on the network or device 218. The users may be grouped 219, and the sentry is assigned to the group to be the users under the sentry's auspices 220. Once the sentry is configured, the system stores the sentry information 221 into the sentry database 222. Any alert messages 223 and any corrective actions for the sentry or sentries to execute are entered into the system 224. For example, actions to execute could be physically observing the user or turning on a camera to observe the user. Any executable corrective actions for the system to execute may be entered as ancillary actions for the sentry 225. System actions, for example, could include logging the purported authorized user, illegal and unauthorized user out of the system and preventing re-entry. The system may store all alert messages, sentry corrective actions and executable corrective actions associated with a sentry or sentries 226 into the sentry database 222.

FIG. 8 is a graphic representation of one embodiment of a probability distribution representation 400 for keystroke timings or dynamics of a user, User A, typing keystrokes ABC, sometimes referred to as a trigram since three keys are included. Even though there are three keys being identified as data or a characteristic for a given application, any other type of measurement, type or combination of measurements may be taken to quantify that characteristic, and then utilized to distinguish and authorize the user possessing those characteristics from the remainder of the wide population or global population from which it is desired to distinguish the authorized user. Item 401 is the numeral one and indicates that the probability goes from zero represented by item 406, to the number one represented by item 401, as will be appreciated by those of ordinary skill in the art, on a statistical modeling basis. The probability 403 is graphed in the Y direction and the time 404 in this aspect or embodiment of the invention is measured in milliseconds. The graphic representation shows the time 404 going from zero, which is represented by item 406, to 5000 milliseconds represented by item 407.

FIG. 8 also illustrates how a couple of units of data may be compared against the user profile or probability distribution representation 400. For instance if data 411 is obtained at the millisecond level represented by 414, it may be expected that User A would show a value at the intersection represented by 409. However, the data 411 is located some distance below intersection 409. The distance 412 from data 411 to intersection 409 is represented by bracket 412 and the distance 413 between data 411 and intersection 414 is represented by bracket 413. In this example a visual check on the location of data 411 at the milliseconds represented by intersection 414, would indicate it is more probable than not that the data point represents User A. It will be appreciated by those of ordinary skill in the art that depending upon the probabilities and the sensitivity and scaling of the probability distribution representation, a greater or lesser distance may or may not be indicative that it is more probable that the purported authorized user is in fact the authorized user, namely User A.

It will be appreciated by those of ordinary skill in the art that for illustrative purposes, graphical representations of the probability distribution representations are shown in the figures; however, any type of representation thereof may be utilized within the contemplation of this invention, such as graphical representations, database or other data structure representations, or any nongraphical representations of the probability distribution, with no one in particular being required to practice this invention.

In a second example in FIG. 8, data 415 is shown with intersection 416 indicating the number of milliseconds, and intersection 417 indicating the intersection with the user profile or trigram for User A. Distance 418 from intersection 417 and distance 419 from intersection 416 would be utilized in any one of a number of different ways to calculate a probability that data 415 is indicative of use by the authorized user, namely User A.

It will also be appreciated by those of ordinary skill in the art that the representation shown in FIG. 8 need not be limited to keyboard dynamics, but may also include an X-Y dynamic related to the speed at which a user moves the X-Y device, such as mouse speed from point A to point B.

FIG. 8 represents one aspect of an embodiment of this invention wherein a trigram or three key keystroke is utilized to pattern or fingerprint User A, which can be one measurement taken of User A, or it could be an averaging or other statistical representation of two or more measurements blended together to arrive at curve 405 in FIG. 8, up to some very high number of measurements scaled to present one probability distribution representation. FIG. 8 shows a narrow band of occurrences in milliseconds relative to probability, making User A relatively distinctive from a wide population sampling or from the global probability distribution representation. In embodiments of this invention, the area 409 under curve 405 should also be one based upon probability distribution representation analysis. The curve 405 is a first constant that gives a continuous basis upon which to compare new data or data on curve 405, to a global trigram such as the global trigram set forth in FIG. 10 for the ABC keystroke combination.

Since many features are recorded for keystroke dynamics, the probability distribution representations can be used to determine more distinguishing features of a user. Those of ordinary skill in the art will appreciate that the same or similar features may be recorded for X-Y device dynamics. In turn, the distinguishing features can be used to construct a biased scoring system to authenticate the user. FIGS. 8-11 illustrate the graphs of the probability distribution representations constructed from the data in Tables 2 and 4. FIG. 8 is the graph for the User A probability distribution representation for the trigram ABC and FIG. 9 is the graph for the User A probability distribution representation for the trigram BCD. FIG. 10 is the graph for the global probability distribution representation for the trigram ABC and FIG. 11 is the graph for the global probability distribution representation for the trigram BCD.

Overlaying the graphs between the user and the global user base for each trigram, FIGS. 12 and 13, and calculating the difference in area 470 and 471 respectively, between the curves, which is the hashed area between the graphs, the ABC trigram user probability distribution representation shows a larger deviation from the global or wide population probability distribution representation. Therefore, the ABC trigram is a more distinguishing feature for the user. Total difference in area under the User A and the global probability curves for the ABC trigram is 1.1, while the total difference in area for the BCD trigram is 0.20. Normalizing these values produces a weighting vector for calculating the final posterior probability. The weighting vector is 0.85 and 0.15 for the ABC and BCD trigrams respectively, yielding a final posterior probability given by equation 1.

$$\text{Posterior}_{final} = (0.85 * \text{Posterior}_{ABC}) + (0.15 * \text{Posterior}_{BCD}) \quad \{1\}$$

The total posterior calculated for determining the likelihood that a user is User A is now biased towards the posterior probability returned from the ABC trigram measurement. An impostor or purported authorized user will more likely fall in the global likelihood and the calculated total posterior will reflect a strengthened likelihood the impostor will be detected as such. The weights attributed to the features of the trigram measurements can also be used in constructions of neural networks, support vector machines and boosting algorithms to further strengthen the bias of the more distinguishable features of an individual.

FIG. 9 is a graphic representation of one embodiment of a probability distribution representation for keystroke timings of a user typing keystrokes BCD. The graphical item numbers, item descriptions and the descriptions of the graph format, the X and Y parameters and measurements, is recited above with respect to FIG. 8, and all like items are numbered accordingly and a description thereof will not be repeated here to avoid repetition. FIG. 9 is a graphic representation of User A typing a keystroke combination of BCD, a trigram, which provides a table of a similar graphic representation, but a very different curve than that shown for User A for the ABC trigram in FIG. 8. The curve illustrated in FIG. 9 is very different than the curve illustrated in FIG. 8 for the same user, namely User A. The area 423 under curve 421 in probability distribution representation 420 should be one. Curve 421 peaks at 421*a*.

FIG. 10 is a graphic representation of one embodiment of a probability distribution representation for keystroke timings of a wide population demographic user group typing keystrokes ABC. The graphical item numbers, item descriptions and the descriptions of the graph format, the X and Y parameters and measurements, is recited above with respect to FIG. 8, and all like items are numbered accordingly and a description thereof will not be repeated here to avoid repetition.

FIG. 10 illustrates a wide population first characteristic probability distribution representation, in this example, a global ABC trigram probability distribution representation, which also may be referred to as a histogram or a bar chart. FIG. 10 shows curve 441 with curve peak 441*a*, area 443 under curve 441 on probability distribution representation 440 illustrates the probabilities of timing of the wide population.

It will be appreciated by those of ordinary skill in the art that the selection of the first characteristic upon which to take data for, or the second third or later characteristics, will be something that greatly depends upon the facts and circumstances of the application, readily available data, readily available measurements and numerous other factors, all within the contemplation of this invention. The wide population characteristic probability distribution representation construction provides a very scalable method of taking data in quantities that can be determined from the circumstances, including huge numbers of data points, to construct a probability distribution representation or histogram against which to compare characteristics or data of individuals. In some applications the wide population data or characteristic can comprise the probability distribution representation profile table or graph, and in others it may represent data from multiple, numerous or a multitude of persons (such as within a demographic or within a broader universe).

FIG. 11 is a graphic representation of one embodiment of a probability distribution representation for keystroke timings of a wide population demographic user group typing the keystrokes BCD. The graphical item numbers, item descriptions and the descriptions of the graph format, the X and Y parameters and measurements, is recited above with respect to FIG. 8, and all like items are numbered accordingly and a description thereof will not be repeated here to avoid repetition.

FIG. 11 represents a probability distribution representation 460 for the wide population data for the keystroke BCD combination or trigram, with area 463 under curve 461. Similar to the global or wide population probability distribution representation in FIG. 10, the probability distribution representation 460 in FIG. 11 may be that of numerous data points from one individual, or from a wide population of numerous individuals, depending upon the application and the distinction desired.

FIG. 12 is a graphic representation of one embodiment of a probability distribution representation for a user typing the keystrokes ABC illustrated in FIG. 8, overlaid on the embodiment of the probability distribution representation for keystroke timings of a wide population demographic user group typing keystrokes ABC illustrated in FIG. 10. The graphical item numbers, item descriptions and the descriptions of the graph format, the X and Y parameters and measurements, is recited above with respect to FIG. 8, and all like items are numbered accordingly and a description thereof will not be repeated here to avoid repetition. Again, neither a graphical representation nor an overlay is required to practice this invention, but is shown in FIGS. 12 and 13 for illustrative purposes.

FIG. 12 illustrates some of the numerous possibilities for use of the probability distribution representations or histograms as may be utilized by the embodiment of this invention. The probability distribution representation illustrated in FIG. 12 is an overlay of the probability distribution representation in FIG. 8 of User A typing ABC trigram, onto the global ABC trigram illustrated in FIG. 10, showing dramatic distinctions or uniqueness between User A from the rest of the population, indicating this may be a more accurate characteristic or data point upon which to distinguish User A from the general population and authenticate the keystrokes of User A. Curve 405 is the User A curve profile on probability distribution representation, and curve 441 is the global or wide population curve for the keystrokes ABC. The area 470 between curve 405 and curve 441 provides a larger area upon which to distinguish or compare a given data point placed therein to the User A curve versus the wide population curve 441.

FIG. 13 is a graphic representation of one embodiment of a probability distribution representation for a user typing the keystrokes BCD illustrated in FIG. 9, overlaid on the embodiment of the probability distribution representation for keystroke timings of a wide population demographic user group typing keystrokes BCD illustrated in FIG. 11. The graphical item numbers, item descriptions and the descriptions of the graph format, the X and Y parameters and measurements, is recited above with respect to FIG. 8, and all like items are numbered accordingly and a description thereof will not be repeated here to avoid repetition.

In a similar manner to FIG. 12, FIG. 13 is an overlay of the User A BCD trigram, which is User A typing a sequence of keys on a keyboard, namely keys B, C, and D, as represented by curve 421. Curve 461 is the wide population curve illustrated in FIG. 11 of the same keystrokes, namely keystrokes BCD. From comparing curve 421 to curve 461 in FIG. 13, it is apparent that User A is very similar to the wide population curve 461 and in comparing the results of the overlay shown in FIG. 13 to that in FIG. 12, it becomes very apparent that in choosing the best characteristic of this set to use to distinguish User A from the general population is keystroke combination ABC and not the keystroke combination BCD.

FIG. 14 is an example of a flowchart of an embodiment of this invention illustrating one possible sequence for constructing a biased scoring system using a characteristic data of an authorized user. FIG. 14 illustrates the process flow to construct weights for the features captured by keystroke dynamics. The system includes start 500, a retrieval of user probability distribution representation 501 from the probability distribution representations 502 for data, characteristics or identifying features for a user or an authorized user. The system retrieves the 503 global probability distribution representations 502 for each feature recorded for the global user base. The probability curve of the user is compared to the global probability curve and a value is calculated 504 for each feature based on the difference the user probability curve deviates from the global probability curve. The values may be normalized 505 to construct a weighting vector for the set of features recorded for keystroke dynamics. The values from the normalization are stored 506 with the probability distribution representations for each feature recorded for the user.

FIG. 15 is the graphic representation of one embodiment of a probability distribution representation as illustrated in FIG. 12, and further wherein a couple exemplary data points or characteristics for a purported authorized user are applied into the table to determine a probability as to whether the purported authorized user is the authorized user base on the data of typing the keystrokes ABC. The graphical item numbers, item descriptions and the descriptions of the graph format, the X and Y parameters and measurements, is recited above with respect to FIG. 8, and all like items are numbered accordingly and a description thereof will not be repeated here to avoid repetition.

FIG. 15 also illustrates how data may be applied to one probability distribution representation such as curve 405, or to a second probability distribution representation represented by curve 441, separately or in combination. If separately applied, it would be similar to the application referred to above in FIG. 8 relative to data 411 or data 415, but if applied to the overlay it could be to determine whether it was more likely data from one or a first demographic to a second demographic. For instance if curve 405 represents an attribute of User A and demographic curve 441 may represent either a global or wide population probability distribution representation. Alternatively if one is trying to distinguish between two different users, such as User A and User B, then demographic curve 441 may be that of User B and a particular data item may be determined to be more probably User A or User B, depending where it falls. It will be appreciated by those of ordinary skill in the art that the application methodology explained herein will work to distinguish between demographics or demographic groups, individuals or between data types are characteristics that best distinguish an individual from a group or a group from another group, all within the contemplation of this invention.

FIG. 15 illustrates data 520 falling on curve 405 at millisecond 522, intersecting curve 441 at 521. This would tend to indicate that data 520 is data representing User A more probably than it is representing data from the demographic or individual represented by curve 441. Similar to the example above, data 525 is distance 527 from curve 441 where it would intersect at intersection 526. Data 525 is distance 528 from intersection 529 with curve 405, at the millisecond level 530 indicated at the intersection. In this example, data 525 would be more likely or more probable from the demographic or individual data or profile represented by curve 441 versus the demographic or individual represented by curve 405. It will be appreciated by those of ordinary skill in the art that individual, global or demographic data may be represented by curve 405 and/or curve 441, with the numerous applications and combinations of applications contemplated by this invention.

FIG. 16 is the graphic representation of one embodiment of a probability distribution representation as illustrated in FIG. 13, and further wherein a couple exemplary data characteristics for a purported authorized user are applied into the table to determine a probability as to whether the purported authorized user is the authorized user base on the data of typing the keystrokes BCD. The graphical item numbers, item descriptions and the descriptions of the graph format, the X and Y parameters and measurements, is recited above with respect to FIG. 8, and all like items are numbered accordingly and a description thereof will not be repeated here to avoid repetition.

FIG. 16 shows data 540 above curve 461 and substantially above curve 421, where intersection 543 would tend to be expected at millisecond level 541. If the respective curves represent a demographic, it would be more probable in this instance that if the probability distribution representations are made individually (i.e. only looking at one curve or the other), it would be more probable that data 540 would be indicative of curve 461 based on its intersection 542; and when comparing to both curve 421 and curve 461, data 540 appears much more probable to be indicative of the demographic or individual represented by curve 461.

Figure 17:
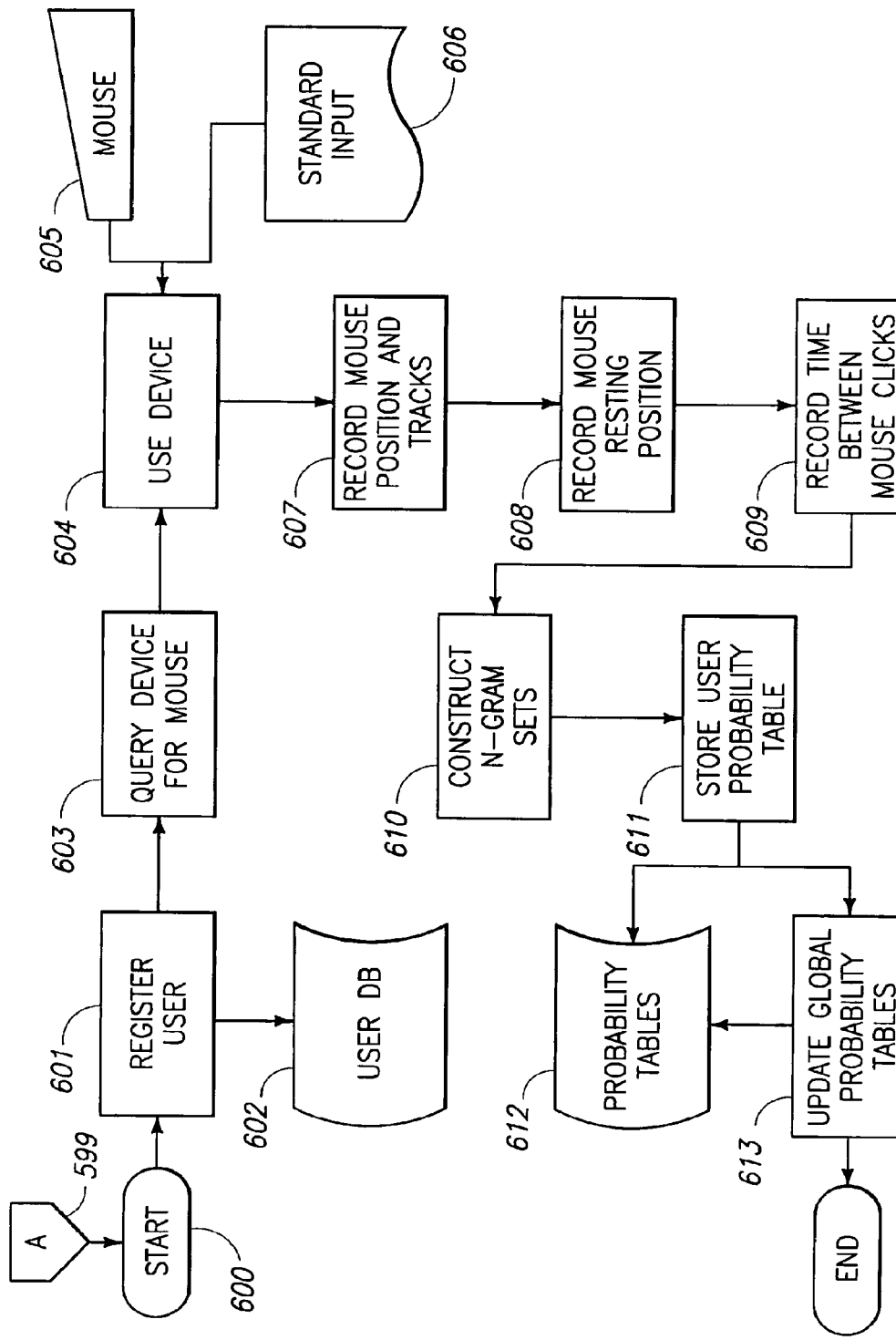
FIG. 17 is an exemplary flowchart illustrating one embodiment of this invention wherein a sequence of logical steps are shown which may access X-Y dynamics of a user, which in this example is a typical computer mouse.

FIG. 17 is an exemplary flowchart illustrating one embodiment of this invention wherein a sequence of logical steps are shown which may access X-Y dynamics of a user, which may be a typical computer mouse in this example. FIG. 17 illustrates the process flow for recording and establishing the authorized user signature or probability distribution reference via mouse dynamics. The authorized user is registered 601 into the authorized user database 602 at a device that is queried for a mouse device 603. The authorized user begins using the device 604 with the mouse 605 with a standard set of input 606, and the system then records cursor and mouse positions 607, cursor resting positions 608 and the timing of mouse clicks 609 to establish the signature pattern for the authorized user and against which other ongoing uses will be measured to determine if a given purported authorized user is in fact the authorized user, or whether he or she is an imposter. The system constructs the n-gram measurements 610 from the mouse recordings, constructs the user probability distribution representation 611 and stores the results into the probability distribution representation database 612. The system updates the global probability with the information captured for each user 613.

Figure 18A:
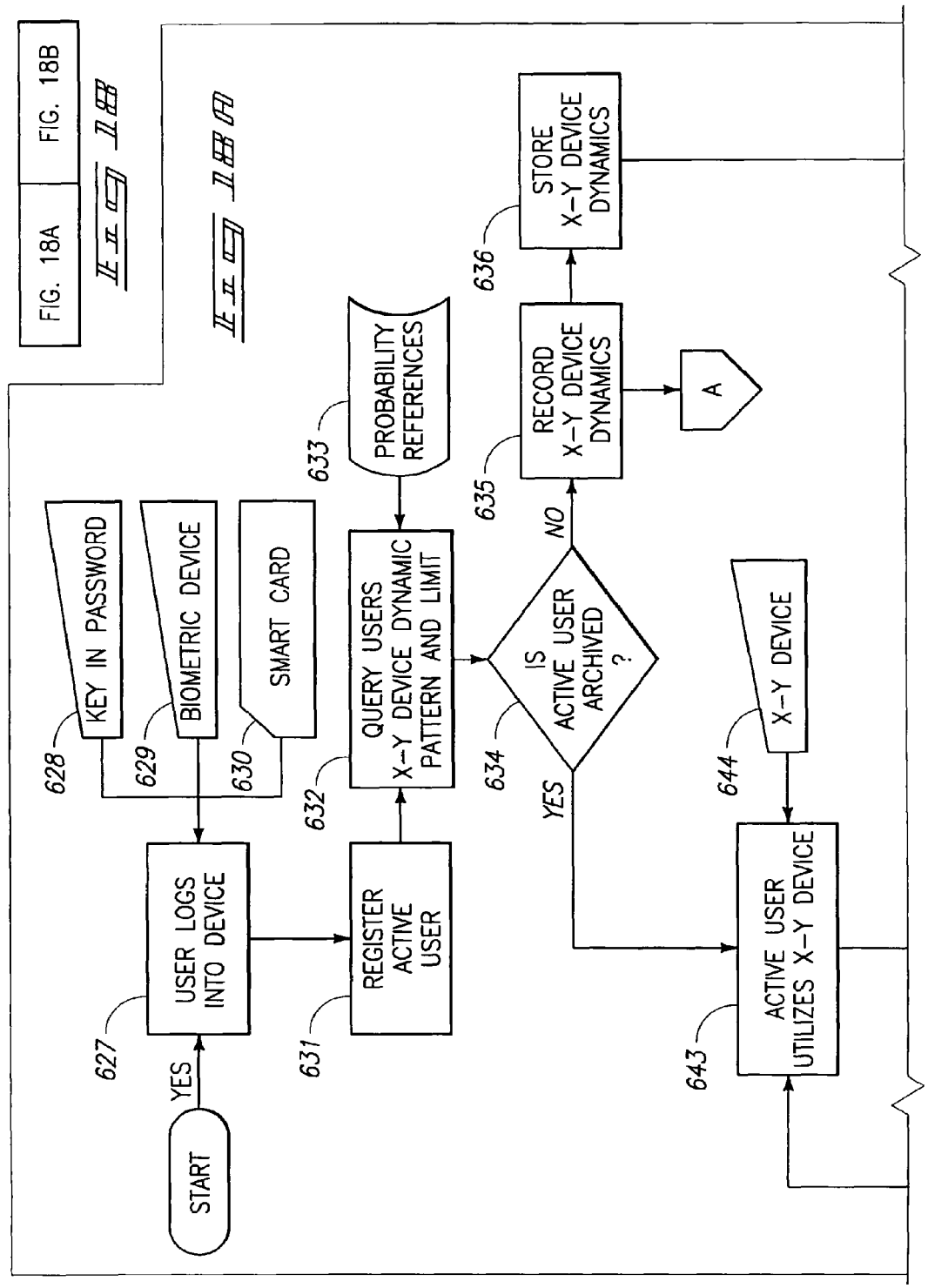
FIG. 18 is an exemplary flowchart illustrating an embodiment of this invention wherein the sequence of steps employed to configure a system to notify the proper sentries of a probability as to whether the purported authorized user is the authorized user based on X-Y device dynamics.

FIGS. 18 (A & B) is an exemplary flowchart illustrating an embodiment of this invention wherein the sequence of steps employed to configure a system to notify the proper sentries of a probability as to whether the purported authorized user is the authorized user based on X-Y device dynamics. FIG. 18 illustrates the process flow for identifying the authorized users or purported authorized users, monitoring any change in the user via the X-Y device (e.g. mouse) dynamics. The purported authorized user logs into the device 627 using the means necessary such as password 628, biometric 629, or smart card 630. The system registers the user the active user 631. The system then queries 632 the probability distribution representation database 633 for the user's mouse dynamics probabilities to use as the baseline comparison for user identification. If the user is not found 634, the system records the mouse dynamics 635 as in FIG. 17 to establish the user mouse dynamic signature and stores the new signature 636. The sentry responsible for unknown users is queried 637 from the sentry database 638 and notified 639 to the new user security event via the means specified for the sentry 640. Any executable actions associated with an unknown user are performed 641, and the system stores the event into the sentry database 642.

If an authorized user is known and training is desired, or just monitoring, the mouse dynamics 643 are continually recorded 644 and compared to the archived dynamics 633 of the active user 646 until the authorized user logs out of the system 645. If the probability of the mouse dynamics for the active user drops below the user probability limit 648 the system queries the sentry database 649 for the sentries responsible for the user identity, notifies the sentries 639 and executes any executable actions 641 associated with the user and logs the event 642.

FIG. 19 is an exemplary flowchart illustrating an embodiment of this invention wherein the sequence of steps employed to configure a system to compare X-Y device dynamics of a purported authorized user to the authorized user probability distribution representation, notifying the proper sentries of a probability as to whether the purported authorized user is the authorized user.

FIG. 19 illustrates the process flow for configuring the sentries, the mechanism or means for contacting the sentries and the corrective actions regarding a discrepancy in user identification. The sentry is entered into the system 614, and the means to contact the sentry are entered 615. The means or mechanism to contact the sentry can be email, text messaging, telephone, paging, or any one of a number of different ways, all within the contemplation of this invention and as shown by box 616. The system queries the registered or authorized user 617 from the authorized user database 618 to be identified on the network or device. The authorized users are grouped 619, and the sentry is assigned to the group to be the users under the sentry's auspices 620. The system stores the sentry information 621 into the sentry database 622. Any alert messages 623 and any corrective actions for the sentry to execute are entered into the system 624. Any executable corrective actions for the system to execute are entered as ancillary actions for the sentry 625. The system stores all alert messages, sentry corrective actions and executable corrective actions into the sentry database 626.

Figure 20:
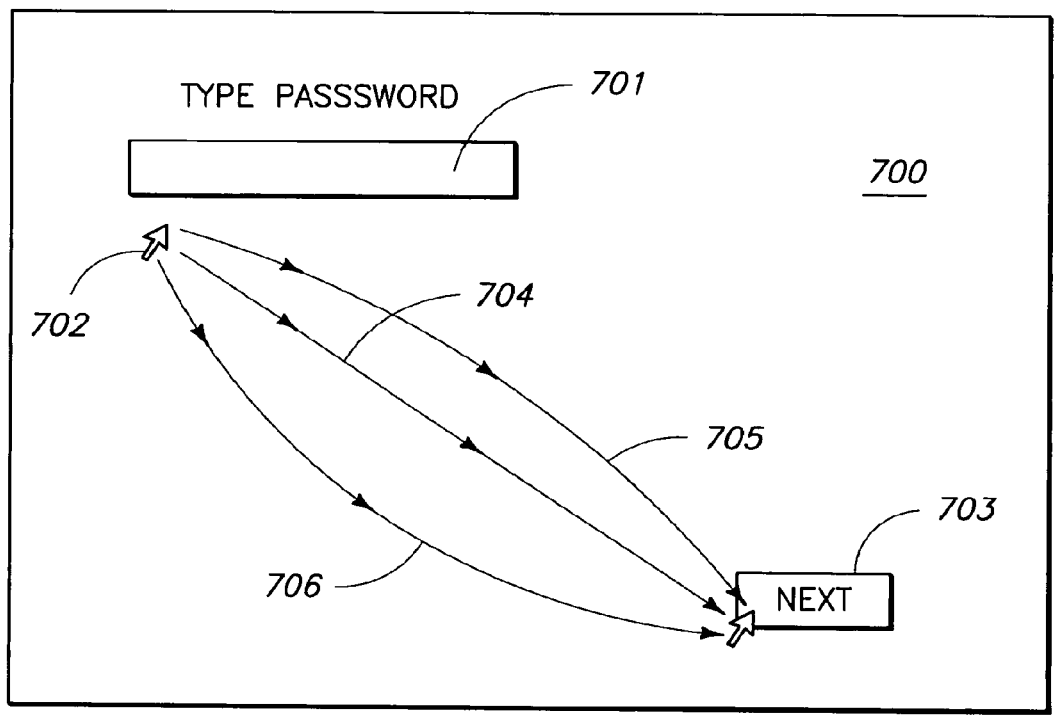
FIG. 20 is a representation of an exemplary computer screen or monitor display which requires that a user utilize an X-Y device movement dynamic and various measurements, data or characteristics which may be utilized therefrom.

FIG. 20 is a representation of an exemplary computer screen or monitor display 700 which requires that a user utilize an X-Y device movement dynamic to move the mouse arrow from the type password 701 to click the next box 703, all graphically represented on computer screen 700 while the movement of the pointer arrow is being accomplished on an X-Y device such as a touch pad, a computer mouse or other X-Y device. FIG. 20 illustrates pointer arrow 702 being moved from a location at or near type password box 701 to a point on or near next box 703. The straight-line path is indicated by line 704, with first alternative path 705 and second alternative path 706. The time it takes to move from the point illustrated at arrow 702 to the point where the arrow 702 is in the next box may also be measured, along with the specific trajectory line above or below the straight-line 704 between the two locations. Measurements or quantification of numerous dynamics may be utilized as data, particularly distinguishing data, to identify or authenticate the purported authorized user of the electronic system. Even the common resting point where a particular user such as an authorized user, would leave their touch pad device, may be an indicator or used as data to identify whether the purported authorized user is in fact the authorized user.

Figure 21:
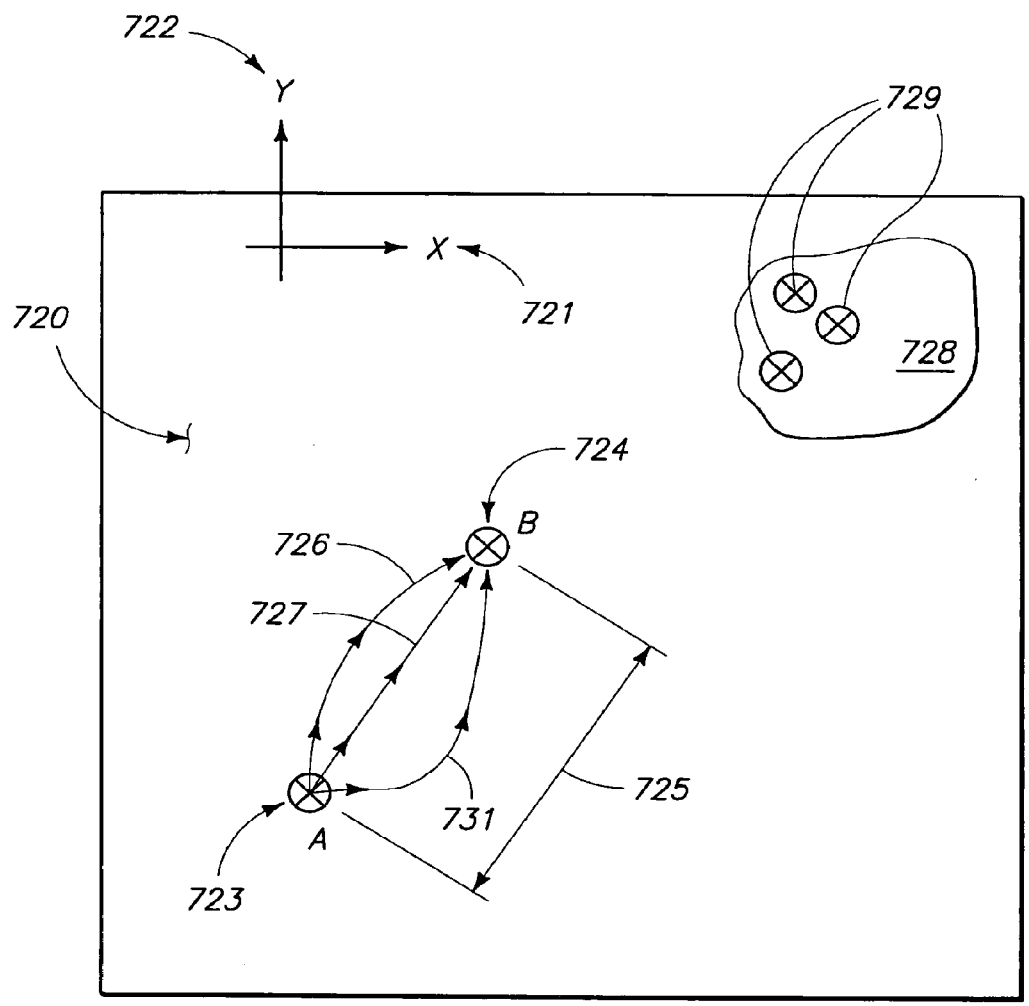
FIG. 21 is a schematic representation of an exemplary X-Y device movement dynamic and various measurements, data or characteristics, which may be utilized therefrom.

FIG. 21 is a schematic representation of an exemplary X-Y device movement dynamic and various measurements. FIG. 21 illustrates an X-Y device 720 which may be any one of a number of different X-Y devices such as a mouse pad 720 or touch pad surface. FIG. 21 illustrates X-Y surface 720, X coordinate 721, and Y coordinate 722. FIG. 21 illustrates a potential movement on an X-Y surface 720 from point A 723 to point B 724. The straight-line path 727 is a distance represented by arrow 725, with first alternative upward trajectory path 726 and second alternative lower trajectory path 731. It will also be appreciated that data may not only include a time measurement in moving from point A to point B, but if the wide population or global profile is more towards trajectory path 726 and the authorized user may tend to travel a longer trajectory path 731, then this may be good distinguishing data to distinguish an authorized user from the wide population or global pattern.

FIG. 21 also illustrates three points 729 in area 728 which may represent a common resting point for a mouse or other part of an X-Y device, and may be a distinguishing characteristic for an authorized user if the wide population or global probability is to rest the X-Y device in the lower left hand corner or the lower right-hand corner of the X-Y surface 720.

As will be appreciated by those of reasonable skill in the art, there are numerous embodiments to this invention, and variations of elements, steps and system components which may be used, all within the scope of this invention.

One embodiment of this invention for example is an authorized user authentication method, comprising: accessing data from an authorized user; using the data to create a first characteristic probability distribution representation indicative of the authorized user; accessing new data from a purported authorized user; comparing the new data of the purported authorized user to the first characteristic probability distribution representation for the authorized user; and determining a probability that the purported authorized user is the authorized user based on the comparing.

In the embodiment referenced in the preceding paragraph above for the authorized user authentication method, aspects include further integrating updated data into the first characteristic probability distribution reference without increasing time required for comparing the new data of the purported authorized user to the first characteristic probability distribution representation for the authorized user and to the wide population first characteristic probability distribution representation. This aspect features the scalability factor of this invention.

It will be noted that because a probability distribution reference or a wide population probability distribution reference are utilized, and only one comparison needs to be made to that probability distribution reference with characteristic data of users, the speed of the comparing will not be diminished as a result of adding new data to train or further comprise the probability distribution reference. This feature makes embodiments of this invention very scalable and potentially on a near unlimited basis, without decreasing the speed of the comparings. Due to the nature of the wide population probability distribution reference, a very large number of new data points for a characteristic may be added to the global or wide population probability distribution reference without decreasing the speed because only one comparison needs to be made to test new or ongoing data against the wide population probability distribution reference on an ongoing or real-time basis. These additions or new data points for addition or integration into probability distribution references or wide population probability distribution references will be stored in storage circuitry. The speed of the updated probability distribution references will compare at the approximate same speed as the probability distribution references before being updated because a comparison is still being made against one such probability distribution reference, albeit an updated one with more data support.

In a further embodiment to the preceding, an authorized user authentication method may be provided, wherein the method further comprises: accessing the data from the authorized user; using the data to create a second characteristic probability distribution representation indicative of the authorized user; accessing the new data from a purported authorized user; comparing the new data of the purported authorized user to the second characteristic probability distribution representation for the authorized user; and determining a probability that the purported authorized user is the authorized user based on the comparing of the new data to the first characteristic probability distribution representation and to the second characteristic probability distribution representation for the authorized user.

In another embodiment of the method disclosed in the second preceding paragraph, an authorized user authentication method may be provided which further comprises: providing a wide population first characteristic probability distribution representation indicative of the first characteristic of a wide population; comparing the new data of the purported authorized user to the first characteristic probability distribution representation for the authorized user and to the wide population first characteristic probability distribution representation; and determining a probability that the purported authorized user is the authorized user based on the comparing. This embodiment may be further wherein determining the probability that the purported authorized user is the authorized user through the application of Bayes Rule to the new data, the first characteristic probability distribution representation for the authorized user, and the wide population first characteristic probability distribution representation; and still further yet wherein determining the probability that the purported authorized user is the authorized user is one of a positive and a negative indication. Aspects of this embodiment may also include the scalable feature wherein further integrating updated data into the wide population first characteristic probability distribution reference without increasing time required for comparing the new data of the purported authorized user to the first characteristic probability distribution representation for the authorized user and to the wide population first characteristic probability distribution representation. This aspect features the scalability factor of this invention.

It will be appreciated by those of ordinary skill in the art that the embodiments and combinations of embodiments illustrated in the preceding paragraphs may be further defined by having specific instead of general equipment and devices, such as: wherein the data is one of a keyboard dynamic and an X-Y device dynamic; or further wherein the X-Y device dynamic is one of a mouse use dynamic and a touch-pad use dynamic.

Another embodiment disclosed by this invention is a method for determining a more probable authentication method, comprising: accessing data from an authorized user; using the data to create a first characteristic probability distribution representation indicative of the authorized user; using the data to create a second characteristic probability distribution representation indicative of the authorized user; providing a wide population first characteristic probability distribution representation indicative of the first characteristic of a wide population; providing a wide population second characteristic probability distribution representation indicative of the second characteristic of a wide population; comparing the first characteristic probability distribution representation indicative of the authorized user to the wide population first characteristic-probability distribution representation indicative of the first characteristic of a wide population; comparing the second characteristic probability distribution representation indicative of the authorized user to the wide population second characteristic probability distribution representation indicative of the second characteristic of a wide population; determining which of the comparings yields a more probable characteristic for authenticating the authorized user from the wide population.

A further embodiment from the one disclosed in the preceding paragraph is a method for determining a more probable authentication method, and further comprised of the following: accessing new data from a purported authorized user; comparing the new data of the purported authorized to probability distribution representations of the more probable characteristic for authenticating the authorized user from the wide population.

A still further embodiment from the one disclosed in the preceding paragraph would be one wherein the first characteristic probability distribution representation indicative of the authorized user is comprised of one of a keyboard dynamic and an X-Y device dynamic. This X-Y device dynamic may be one of a mouse input and a touchpad dynamic, or some combination thereof.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A computerized method for authenticating a user of an electronic system, comprising:
   accessing, from a storage circuitry, data relating to measured parameters for a plurality of interactions with an input device for a purported authorized user;
   accessing, from the storage circuitry, a probability distribution representation for the plurality of interactions for an authorized user;
   accessing, from the storage circuitry, a probability distribution representation for the plurality of interactions for a wide population;
   determining with a computer processing circuitry, a value indicative of whether the purported authorized user is the authorized user, utilizing (a) the data for the purported authorized user for the plurality of interactions, (b) the probability distribution representation for the authorized user for the plurality of interactions, and (c) the probability distribution representation for the wide population for the plurality of interactions; and
   authenticating with the computer processing circuitry, the purported authorized user as the authorized user, if the value satisfies a prescribed threshold.

2. The computerized method for authenticating a user as recited in claim 1, further comprising accessing a belief value indicative of a prior probability whether the purported user is the authorized user; wherein, in the determining step, the utilizing further includes the belief value.

3. The computerized method for authenticating a user as recited in claim 1, wherein the input device is selected from a group consisting of keyboard, a keypad, a touch screen, touch pad, a mouse, or other X-Y device.

4. The computerized method for authenticating a user as recited in claim 1, wherein the interaction is selected from a list consisting of a keystroke dynamic, a type of body movement, a facial profile, and an X-Y device dynamic.

5. The computerized method for authenticating a user as recited in claim 1, wherein the authentication step further includes executing predefined security actions if the value fails to satisfy a security threshold level.

6. The computerized method for authenticating a user as recited in claim 1, wherein the probability distribution representation for the wide population excludes the authorized user.

7. A computerized method for authenticating a user of an electronic system, comprising:
   accessing, from a storage circuitry, data for measured interactions with one or more input devices for a purported authorized user, including a first interaction and a second interaction;
   accessing, from the storage circuitry, user probability distribution representations for an authorized user relating to measured interactions with one or more input devices, including the first interaction and the second interaction;
   accessing, from the storage circuitry, global probability distribution representations for a wide population based on the wide population performing interactions with one or more input devices, including the first interaction and the second interaction;
   determining with a computer processing circuitry, a total value indicative of whether the purported authorized user is the authorized user, utilizing (a) the data for the purported authorized user for the first interaction and the second interaction, (b) the user probability distribution representations for the first interaction and the second interaction, and (c) the global probability distribution representations for the first interaction and the second interaction; and
   authenticating with a computer processing circuitry, the purported authorized user to be the authorized user for authentication, if the total value satisfies a prescribed threshold.

8. The computerized method for authenticating a user as recited in claim 7, wherein the one or more input devices is selected from a group consisting of keyboard, a keypad, a touch screen, a touch pad, a mouse, or other X-Y device.

9. The computerized method for authenticating a user as recited in claim 7, wherein the measured interactions are selected from a list consisting of keystroke dynamics, types of body movements, facial profiles, and X-Y device dynamics.

10. The computerized method for authenticating a user as recited in claim 7, wherein the authentication step further includes executing predefined security actions if the value fails to satisfy a security threshold level.

11. The computerized method for authenticating a user as recited in claim 7, wherein the global probability distribution representations exclude the authorized user.

12. The computerized method for authenticating a user as recited in claim 7, wherein the first interaction and the second interaction performed with different types of input devices.

13. The computerized method for authenticating a user as recited in claim 7, wherein at least one of the user probability distribution representation and the global probability distribution representation further accounts for parameters for time of day and type of application.

14. The computerized method for authenticating a user as recited in claim 7, further comprising accessing a belief value indicative of a prior probability whether the purported user is the authorized user; wherein, in the determining step, the utilizing further includes the belief value.

15. A computerized system for authenticating a user of an electronic system, comprising:
   a storage circuitry configured to store
      purported-user data for measured interactions with one or more input devices for a purported authorized user, including a first interaction and a second interaction,
      user probability distribution representations for an authorized user relating to measured interactions with one or more input devices, including the first interaction and the second interaction, and
      global probability distribution representations for a wide population based on the wide population performing interactions with one or more input devices, including the first prescribed interaction and the second prescribed interaction;
   a processing circuitry configured to determine a value indicative of whether the purported authorized user is the authorized user, utilizing (a) the data for the purported authorized user for the first interaction and the second interaction, (b) the probability distribution representation for the authorized user for the first interaction and the second interaction, and (c) the probability distribution representation for the wide population for the first interaction and the second interaction; and to control access of the purported authorized user based on the value.

16. The system for as recited in claim 15, wherein purported-user data is configured as probability distribution representations.

17. The system as recited in claim 15, wherein the global probability distribution representations exclude the authorized user.

18. The system as recited in claim 15, wherein the digital storage assembly further stores a belief value indicative of a prior probability whether the purported authorized user is the authorized user; wherein further the determining further utilizes the belief value.

19. The system as recited in claim 15, further configured to execute computer-readable instructions for monitoring interactions with the one or more input devices by the purported authorized user to update the data characteristic of a purported authorized user in the digital storage assembly.

20. The system as recited in claim 15, wherein the interactions are selected from a list consisting of keystroke dynamics, types of body movements, facial profiles, and X-Y device dynamics.

* * * * *